United States Patent
Dey et al.

(10) Patent No.: US 10,409,882 B2
(45) Date of Patent: Sep. 10, 2019

(54) METHOD AND APPARATUS FOR NAVIGATION IN WEBPAGE

(71) Applicant: SAMSUNG ELECTRONICS CO., LTD., Suwon-si (KR)

(72) Inventors: Biswajit Dey, Noida (IN); Gitanshu Mehndiratta, Noida (IN); Mukesh Kumar Gupta, Noida (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 201 days.

(21) Appl. No.: 15/355,204

(22) Filed: Nov. 18, 2016

(65) Prior Publication Data
US 2017/0140063 A1    May 18, 2017

(30) Foreign Application Priority Data
Nov. 18, 2015 (IN) .......................... 3775/DEL/2015

(51) Int. Cl.
| | | |
|---|---|---|
| *G06F 3/048* | (2013.01) | |
| *G06F 16/957* | (2019.01) | |
| *G06F 3/0484* | (2013.01) | |
| *G06F 3/0482* | (2013.01) | |
| *G06F 3/16* | (2006.01) | |
| *G06F 16/954* | (2019.01) | |

(52) U.S. Cl.
CPC .......... *G06F 16/957* (2019.01); *G06F 3/0482* (2013.01); *G06F 3/04842* (2013.01); *G06F 3/04847* (2013.01); *G06F 3/165* (2013.01); *G06F 16/954* (2019.01)

(58) Field of Classification Search
CPC .......... G06F 17/30873; G06F 17/2247; G06F 17/30864; G06F 17/30899; G06F 17/30905; G06F 3/04842; G06F 17/24; G06F 17/30368; G06F 17/30867; G06F 17/30887; G06F 17/3089; G06F 17/30896; G06F 3/0485
See application file for complete search history.

(56) References Cited

U.S. PATENT DOCUMENTS

| | | | |
|---|---|---|---|
| 6,034,689 A | 3/2000 | White et al. | |
| 6,792,595 B1 * | 9/2004 | Storistenau | ............... G06F 8/33 345/650 |
| 7,111,243 B1 | 9/2006 | Ballard et al. | |
| (Continued) | | | |

FOREIGN PATENT DOCUMENTS

WO    2011/054072 A1    5/2011

OTHER PUBLICATIONS

International Search Report (PCT/ISA/210) dated Feb. 27, 2017, issued by the International Searching Authority in counterpart International Application No. PCT/KR2016/013296.
(Continued)

*Primary Examiner* — Di Xiao
(74) *Attorney, Agent, or Firm* — Sughrue Mion, PLLC

(57) ABSTRACT

The present disclosure provides method and a system (200) for navigation in a webpage. The system (200) operates at least in accordance with the method that comprises: receiving (step 101) a navigation command to navigate in the webpage, identifying (step 104) at least one content based setting; and navigating (step 106) through the webpage from a webpage element to another webpage element based on said content based setting.

19 Claims, 21 Drawing Sheets

(56) References Cited

U.S. PATENT DOCUMENTS

| | | | |
|---|---|---|---|
| 8,977,982 B1* | 3/2015 | Amacker | G06F 3/014 |
| | | | 715/787 |
| 2003/0004995 A1 | 1/2003 | Novaes | |
| 2006/0206832 A1 | 9/2006 | Celik et al. | |
| 2007/0073777 A1 | 3/2007 | Werwath et al. | |
| 2010/0031176 A1 | 2/2010 | Song | |
| 2011/0126087 A1 | 5/2011 | Aust | |
| 2011/0212430 A1* | 9/2011 | Smithmier | G09B 5/06 |
| | | | 434/322 |
| 2013/0227398 A1 | 8/2013 | Bolstad | |
| 2014/0006982 A1 | 1/2014 | Wabyick et al. | |
| 2014/0089772 A1 | 3/2014 | Shetty et al. | |
| 2014/0245205 A1 | 8/2014 | Smith | |
| 2014/0380149 A1 | 12/2014 | Gallo et al. | |
| 2016/0247192 A1* | 8/2016 | Evans | G06Q 30/0255 |

OTHER PUBLICATIONS

Written Opinion (PCT/ISA/237) dated Feb. 27, 2017, issued by the International Searching Authority in counterpart International Application No. PCT/KR2016/013296.

Communication dated May 18, 2018, issued by the European Patent Office in counterpart European Application No. 16866673.3.

* cited by examiner

700

```
Filter_Data_Structure
{
    Image_Data: ON
    Text_Data: OFF
    Video_Data: OFF
    Input_Data: OFF
    Image_Data {
            -   Size : 1024 x 720
            -   Tape : null
            -   Text :  null
    }
```

FIG.7

METHOD AND APPARATUS FOR NAVIGATION IN WEBPAGE

CROSS-REFERENCE TO RELATED APPLICATION(S)

The present application claims priority under 35 U.S.C. § 119(a) to Indian Patent Application filed on Nov. 18, 2015 in the Indian Intellectual Property Office and assigned Serial number 3775/DEL/2015, the entire disclosure of which is hereby incorporated by reference.

TECHNICAL FIELD

The present disclosure relates generally to a method and apparatus for navigation in a webpage and in particular relates to a method and apparatus for navigation across focusable elements in the webpage.

BACKGROUND

Digital televisions, personal computers and other similar devices provide a facility to navigate within the web-pages to traverse various applications or elements rendered in the web-page. The navigation involves movement of a graphical control (say a graphical cursor ring) throughout various focusable elements in the web-page such as anchor text (hyperlink), input receiving elements (such as cheque boxes, radio button, text-boxes), image, video files. Examples of various controls that may be used to execute such navigation may be actuation of tab-key along with modified keys such as "Shift" key to move sequentially along the focusable elements. Other examples of controls to exercise such navigation may include a remote control, a joystick etc.

In a web-page, the focusable elements such as hyperlink or non-focusable elements such as a plain text are stored in the form of nodes in a Node tree or a Document Object Model (DOM) tree inside a web-browser. The DOM tree is traversed initially while rendering the web-page and the nodes from the DOM tree that correspond to the focusable elements are stored in a 'Cache List' of the browser. The nodes may also be interchangeably referred as the webpage elements for being focusable in web-page and due to the fact that they are operable by a user.

As a result, when user wants to move the cursor ring in the right direction using the tab key or a remote control button to reach a focusable element next in sequence, the cache list is searched sequentially to determine if the next element or next node is spatially overlapping (based on a center-to-center distance between the adjacent nodes) in the right geometrical area of the earlier node within the web-page. A spatial navigation pattern algorithm may be used to determine an optimum intersection of the two areas. If there is no such node present in the Cache List, then the search proceeds in the downward direction. If a focusable node is obtained that spatially overlaps with the vertically lower geometrical area of the earlier node, then the cursor ring reaches the focusable node as retrieved in the downward direction. Upon subsequent actuation of the tab key, the search is again made in the right direction of the current focusable node and likewise, the direction of search proceeds linearly rightwards and downwards, if further tab-key is actuated by the user.

At least one drawback of the above-depicted search of focusable nodes is that the search is mandatorily performed for all focusable elements. In other words, the traversal based on conventional navigation techniques is based on accessing the nearest spatially overlapping node (either in horizontal or vertical direction). Such mechanism does not take into account the content setting or nature of the node for deciding the route of traversal from one focusable node to another. In other words, the current mechanism to navigate across the nodes in the web-page is node-neutral. In an example, if a user wishes to reach a last text box in a web-page from a currently selected text box located at middle of the web-page through using the tab-key and other similar navigation techniques, the same is only possible in an extreme case where there is altogether no focusable node between the currently highlighted text box and the last text box. Considering the trend of web-pages being congested and having a lot of focusable elements these days, the user has to mandatorily traverse each of the intervening focusable nodes (which may be images, hyperlinks, videos etc) to finally reach a preferred node or element in the web-page.

As per one of the known navigation techniques for web-pages that used tab-key or remote control based key, a method exists wherein the navigation is performed among discrete screen pages of a webpage displayed one at a time, and from one currently loaded webpage to another web-page that is associated with the hyperlink within the loaded web-page. However, such technique merely leads to an enhanced user interaction while following the conventional navigation pattern Another prior art relates to a manner of navigating a web-page by defining a logical flow of multiple content regions in a display page, and initiating display of a first content region of the multiple content regions. In response to receiving a navigation input in the display page to view a next content region following the first content region in the logical flow, the second content region is identified that follows the first content region in the logical flow. However, the present prior art describes navigation through logical regions in a complete webpage, while not skipping any part of the web-page whether is relevant or irrelevant.

Another prior art relates to a method for browsing a media document having hyperlinks. The method includes steps of activating at least one sub-region on the media document, activating at least one hyperlink in the activated sub-region, and finally selecting the activated link in the activated sub-region. However, the described navigation is merely based on hyperlinks organized into sub-regions.

Yet another prior art describes a method of navigating data blocks in Web page and illustrates opening a first data block of a plurality of data blocks of interest. The plurality of data blocks are spatially indexed in N dimensions. Based on viewing a closeness relationship between the first data block opened and a second plurality of data blocks based on their content, the second data block is accessed which is observed to be closest to the first data block. However, the prior art compels the user to navigate across all of the data blocks, instead of jumping to a specific data block based on a user input.

Yet another prior art describes a user-input entered from a remote input device over an infrared (IR) link. The user input specifies a direction in which the user wishes to move a selection relative to a currently selected hypertext anchor. Based on the user input, a determination is made as to which one of the hypertext anchors is a best selectable hypertext anchor, and that hypertext anchor is then selected and indicated as such to the user. The user interface allows selection of hypertext anchors which are part of either client side or server-side image maps. However, the described sequential navigation only emphasizes navigation among selectable hypertext anchors.

Yet another prior art describes a method of navigation that includes dividing the web page into a plurality of blocks; assigning at least one indexing number to the divided block, receiving a user's command to select the indexing number; and displaying the block corresponding to the selected indexing number. However, moving from a particular type of web-element (say image) in one block to similar type of element (another image) in another block requires a user to manually identify the another block and determine its indexing number.

At least based on aforesaid, it may be understood that the existing state of the art is able to differentiate the nodes or web-elements only on the basis of the x and y coordinates in a web page and always exhibit a linear traversal, which is usually a combination of horizontal and vertical movements of cursor ring.

Thus, there lies at least a need to enable navigation of the focusable nodes in the web-pages that enables bypassing of unwanted focusable nodes in the course of navigation.

SUMMARY

This summary is provided to introduce a selection of concepts in a simplified format that are further described in the detailed description of the present disclosure. This summary is not intended to identify key or essential inventive concepts of the claimed subject matter, nor is it intended for determining the scope of the claimed subject matter.

Accordingly, in accordance with an aspect of the present disclosure, the present disclosure as embodied and broadly described herein provides a method and system for navigation in a webpage. The system operates at least in accordance with the method that comprises: receiving a navigation command to navigate in the webpage, identifying at least one content-based setting; and navigating through the webpage from a webpage element to another webpage element based on the content-based setting.

In another embodiment, the present disclosure provides a method and system, wherein the system operates at least in accordance with the method comprising: receiving a navigation command to navigate in the webpage; identifying at least one content-based setting; retrieving a Document Object Model (DOM) tree representing the webpage and searching for the at least one content-based setting in Document Object Model (DOM) nodes contained in the DOM tree; retrieving DOM nodes matching the at least one content-based setting; and navigating through the webpage from a webpage element to another webpage element, wherein each webpage element corresponds to a retrieved DOM node.

The advantages of the present disclosure include, but are not limited to, providing a faster and customized navigation in a webpage based on types and nature of focusable nodes or web elements. The time efficiency is achieved at least through bypassing non-desired focusable elements during the navigation. Moreover, the user is enabled to plan the course of navigation over the web-page as per his/her needs to navigate only across desired focusable elements.

To further clarify advantages and features of the present disclosure, a more particular description of the disclosure will be rendered by reference to specific embodiments thereof, which is illustrated in the appended drawings. It is appreciated that these drawings depict only typical embodiments of the disclosure and are therefore not to be considered limiting of its scope. The disclosure will be described and explained with additional specificity and detail with the accompanying drawings.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 7 illustrates a data representation created by the user interface of FIG. 6 upon receiving user input, in accordance with both embodiments of the present disclosure:

Figure 1:
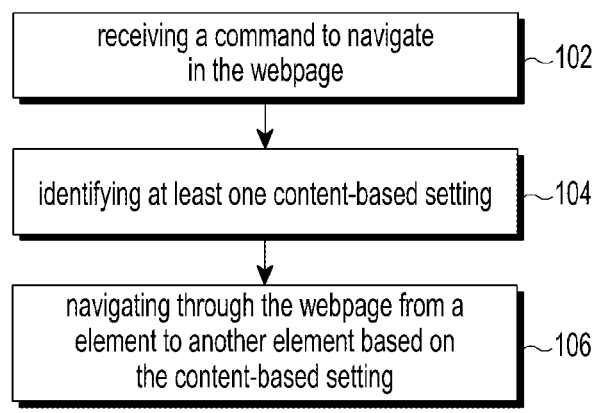
FIG. 1 illustrates a flow chart corresponding to an embodiment of the disclosure.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

DETAILED DESCRIPTION

For the purpose of promoting an understanding of the principles of the present disclosure, reference will now be made to the embodiment illustrated in the drawings and specific language will be used to describe the same. It will nevertheless be understood that no limitation of the scope of the present disclosure is thereby intended, such alterations and further modifications in the illustrated system, and such further applications of the principles of the present disclosure as illustrated therein being contemplated as would normally occur to one skilled in the art to which the disclosure relates.

It will be understood by those skilled in the art that the foregoing general description and the following detailed description are exemplary and explanatory of the present disclosure and are not intended to be restrictive thereof.

Reference throughout this specification to "an aspect", "another aspect" or similar language means that a particular feature, structure, or characteristic described in connection with the embodiment is included in at least one embodiment of the present disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this present disclosure belongs. The system, methods, and examples provided herein are illustrative only and not intended to be limiting.

Embodiments of the present disclosure will be described below in detail with reference to the accompanying drawings.

Now referring to FIG. 1, it can be seen that the present disclosure provides a method for navigation in a webpage. In accordance with a first embodiment, the method comprises receiving (step 102) a navigation command to navigate in the webpage. The navigation command is provided by user through at least one of pointer, mouse, keyboard, gesture, voice, touch, stylus. Based upon such receipt of the navigation command, at least one content-based setting is identified (step 104). The content setting may be an element setting (type of element such as image, audio, video, etc) and an element attribute setting (size, format, resolution etc). Based upon such identification, the webpage gets navigated (step 106) from a webpage element to another webpage element at least based on the content-based setting. An operation that elaborates the present method steps has been covered in FIG. 4 and FIG. 5B.

Figure 2:
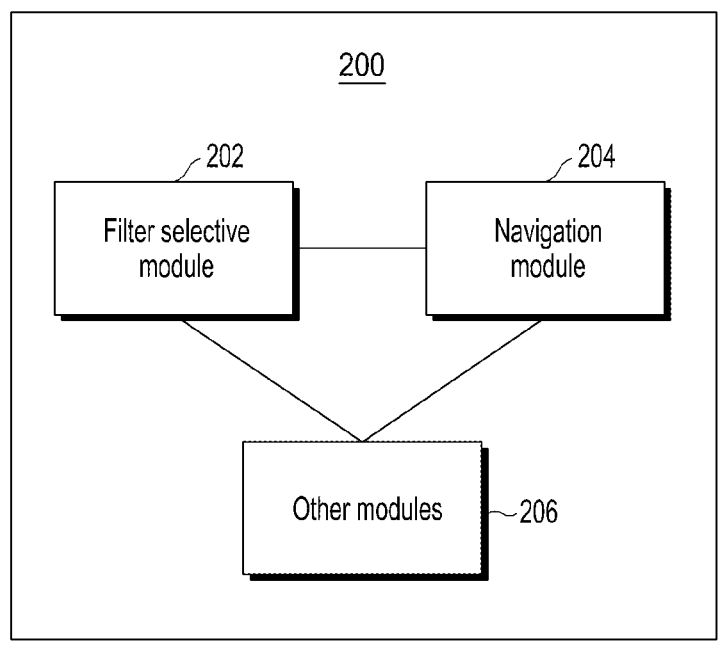
FIG. 2 illustrates a system in accordance with an embodiment of the present disclosure.

Referring to FIG. 2, the present disclosure also provides an apparatus 200 for navigating a webpage. The apparatus 200 comprises a filter selective module 202 for receiving a content-based setting from a user and a navigation module 204 that performs that steps 102 till 106 based on the content setting as received by the filter selective module 202.

The filter selective module 202 in turn may include a graphical user interface (as explained later) to receive the content-based setting and a data processing unit to process and store the content-based setting on a memory. Specifically, the filter selective module 202 allows the user to provide a selection-criteria for navigation on a web page and accordingly decide a navigational route in the currently open webpage in a tab of a browser-window, based on receiving a user input. The navigation module 204, upon receiving a navigational command from the user, accesses focusable nodes or web-page elements from the DOM tree of the currently open webpage, and considers content setting received by the filter selective module 202 to shortlist one or more desired focusable nodes that shall be exclusively highlighted through the graphical cursor ring.

In addition, the system 200 also includes other modules 206 that enable an operational interconnection between the filter selective module 202 and the navigation module 204 and execution of their respective functionalities.

Figure 3:
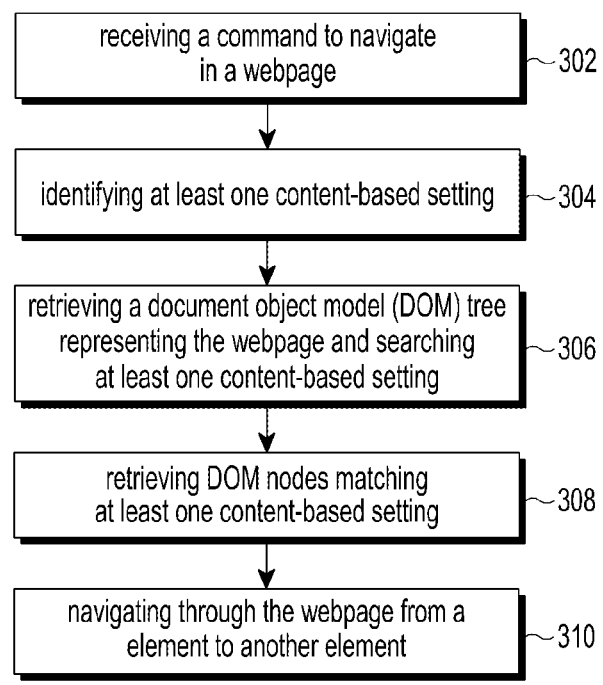
FIG. 3 illustrates a flow chart corresponding to a embodiment of the disclosure.

Now referring to FIG. 3, it can be seen that the present disclosure in accordance with a second embodiment provides another method (300) for navigation in a webpage. The method comprises receiving (step 302) a navigation command from the user to navigate in the webpage. Based on the receipt, at least one content-based setting is identified (step 304), wherein such content setting may be an element setting (type of element such as image, audio, video, etc) and an element attribute setting (size, format, resolution etc). Thereafter, a Document Object Model (DOM) tree representing the webpage is retrieved (step 306) and at least one content-based setting in Document Object Model (DOM) nodes contained in the DOM tree is searched based on the content setting. Further, the DOM nodes matching the received content-based setting are retrieved (step 308) and accordingly, the webpage is navigated (step 310) from a webpage element to another webpage element, such that each webpage element corresponds to the retrieved DOM node.

The steps as outlined in the present FIG. 3 may be executed by the navigation module 204 based on the content setting received through the filter selective module 202 and the DOM tree structure of the currently loaded website.

Figure 4:
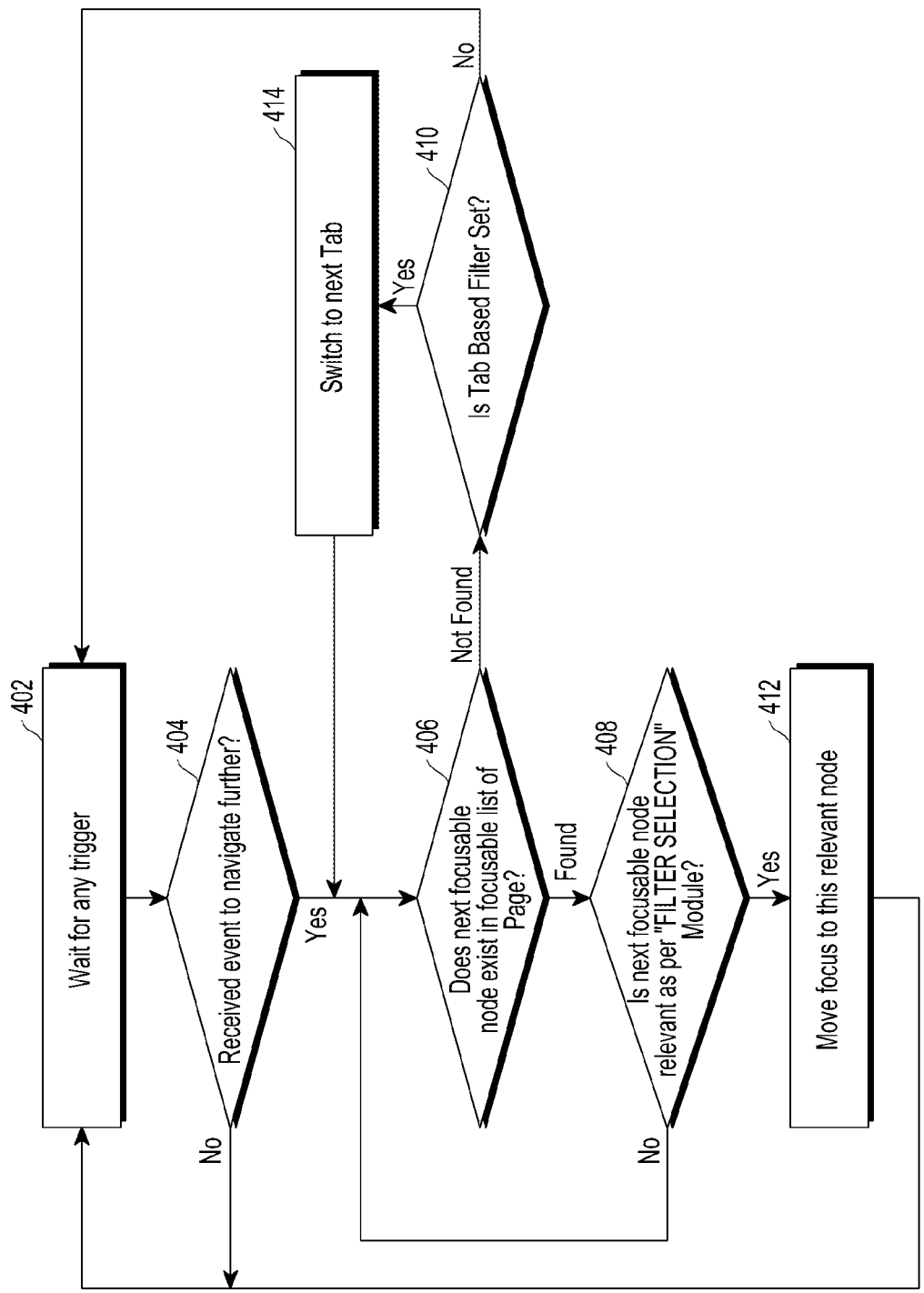
FIG. 4 illustrates an operation in respect of the aforesaid embodiments.

FIG. 4 depicts an operation in accordance with method depicted in aforesaid embodiments of FIG. 1 and FIG. 3. As may be seen from the figure, the exemplary operation is in the form a sequence of steps, wherein each exemplary step in the present figure merely exemplifies one more method steps as recited in FIGS. 1 and 3 and accordingly shall not be construed as limiting the scope of aforesaid steps.

At step 402, a navigational command in the form of a user provided trigger is awaited.

At step 404, it is ascertained whether a currently received user input is a navigational command. In case YES, then control passes to step 406, else the control passes back to step 402. Both steps 402 and 404 jointly correspond to each of the steps 102 and 302 in the preceding figures.

At step 406, it is checked whether a next focusable node exists in the DOM tree of the currently loaded web-page. If yes, then the control passes to step 408, else the control passes to step 410.

At step 408, it is checked whether the next focusable node is relevant as per the content setting already received from the user though the filter selective module 202. The content setting may also be referred as user-defined filter criteria for achieving a desired navigation. If the result of checking in the present step is positive, then in step 412, the graphical cursor ring is focussed upon such just-found focusable node and thereafter the control passes back to step 402 to await next user trigger. The steps 408 and 412 correspond to the steps 104, 106 of FIG. 1, respectively, and steps 304 till 310 of FIG. 3.

At step 410, it is checked whether the content setting as already received from the user through the filter selective mode 202 also includes a tab based identifier as an additional criteria. More specifically, it is checked whether the navigation based on the user-defined criteria shall also be conducted for other web-pages that are currently open in other currently open tabs. If yes, then the tab is switched in step 414 and the control passes to step 406 for performing the user-defined navigation over the nodes in the new tab, wherein the initial-most node in the new tab that matches the criteria get automatically focussed by the cursor ring. Thereafter, based on subsequent user provided navigation commands, other focusable nodes meeting the filter criteria get highlighted within the new tab. The step 410 singularly also corresponds to steps 104 of FIG. 1 and step 304 of FIG. 3.

However, at step 410, if it is ascertained that there is no navigation to be performed in any other tab, then control returns to step 402 wherein further trigger from user is awaited.

Figure 5A:
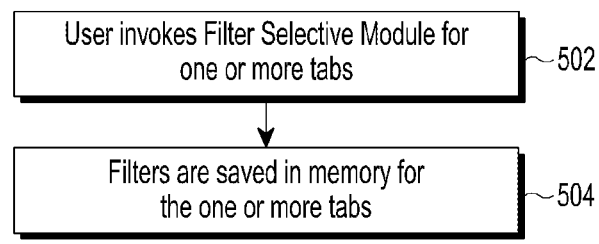
FIG. 5A and FIG. 5B illustrate the operation depicted in FIG. 4 through a modular approach.
Figure 5B:
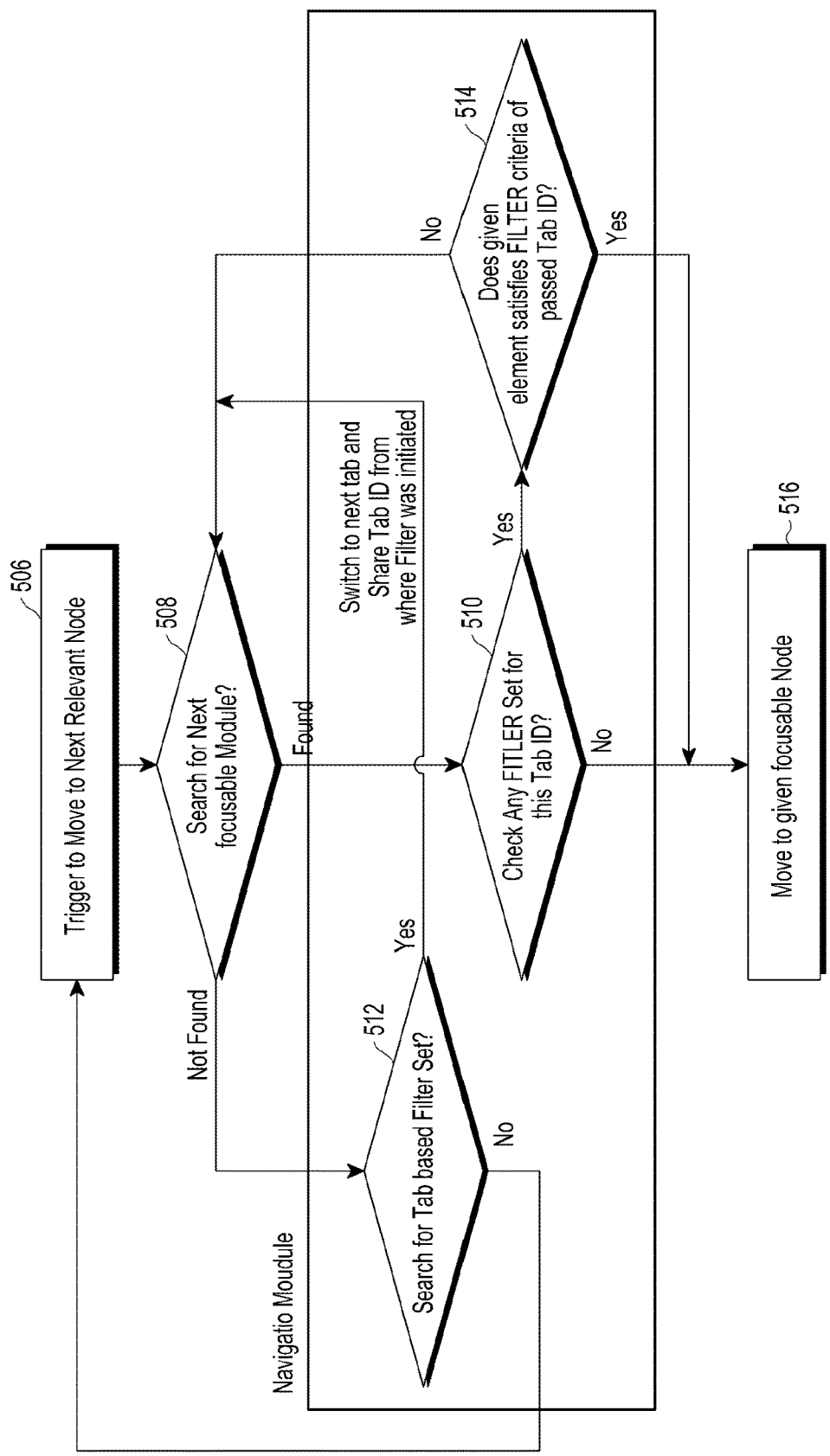

FIG. 5 further elaborates the operation of the FIG. 4 as being a functionality of two modules-filter selective module 202 (as represented in FIG. 5A) and the navigation module 204 (as represented in FIG. 5B). Accordingly, a step-wise functionality in both modules has been illustrated as follows.

To begin with, in step 502 of FIG. 5A, a user command is received to invoke the filter selective module 202 for at least one tab in the web-browser window. The tab may be a single tab or a group of tabs active in the browser window. Accordingly, there may be a simultaneous selection of one or more tabs for being operated upon by the filter selective module 202. In one example, the filter selective module 202 may be invoked by default for all active tabs in the web-browser window.

In step 504, the user provided input or content setting is received and one or more filter criterion is created for user-selected one or more tabs or a given number of tabs by default. For example, the user may provide 'text box' as content setting and accordingly a filter is generated such that the prospective navigation in the web-page will only focus text boxes, every time a navigation command is received from the user. Likewise, there may be other types of generated filters or criteria as will be explained later in the description.

Now in FIG. 5B that represents the step wise functionality in the navigation module 204, the steps 506 and 508 correspond to steps 404 and 406 of FIG. 4. In case condition in 508 is satisfied i.e. a next focusable node has been found in the current web-page, then the control passes to step 510. Else the control passes to step 512 that is equivalent to step 410 of FIG. 4.

Steps 510 and 514 jointly correspond to step 408 of FIG. 4. Specifically, the dual stage verification as done in steps 510 and 514 is performed over the just-found focusable node. In step 510 it is checked whether there is any further criteria set to further scrutinize the just-found focusable node. For example, the user may have selected only such text boxes in the web-page to be highlighted that are of a particular length and breadth. Accordingly, if any such criteria is found to be set, then the just-found focusable node in assessed based on the criteria in step 514. In case the node fulfils the criteria, then control passes to step 516 (that corresponds to step 412) for moving the cursor ring to the node. If not, then the control passes to step 506 to resume a lookout or new focusable node in the present tab. However, if it is determined in step 510 then no further criteria exists, then the just-found focusable node gets highlighted under step 516.

In step 512 that is equivalent to step 410 of FIG. 4, it is checked whether the content setting as already received from the user through the filter selective mode 202 also includes a tab based identifier. If yes, the control passes to step 508 for performing the user-defined navigation over the nodes in the new tab, wherein the initial-most node in the new tab that matches the criteria is focussed by the cursor ring. However, at step 512, if it is ascertained that there is no navigation to be performed in any other tab, then control returns to step 506, wherein a further trigger from user is awaited to perform any further action.

Figure 6:
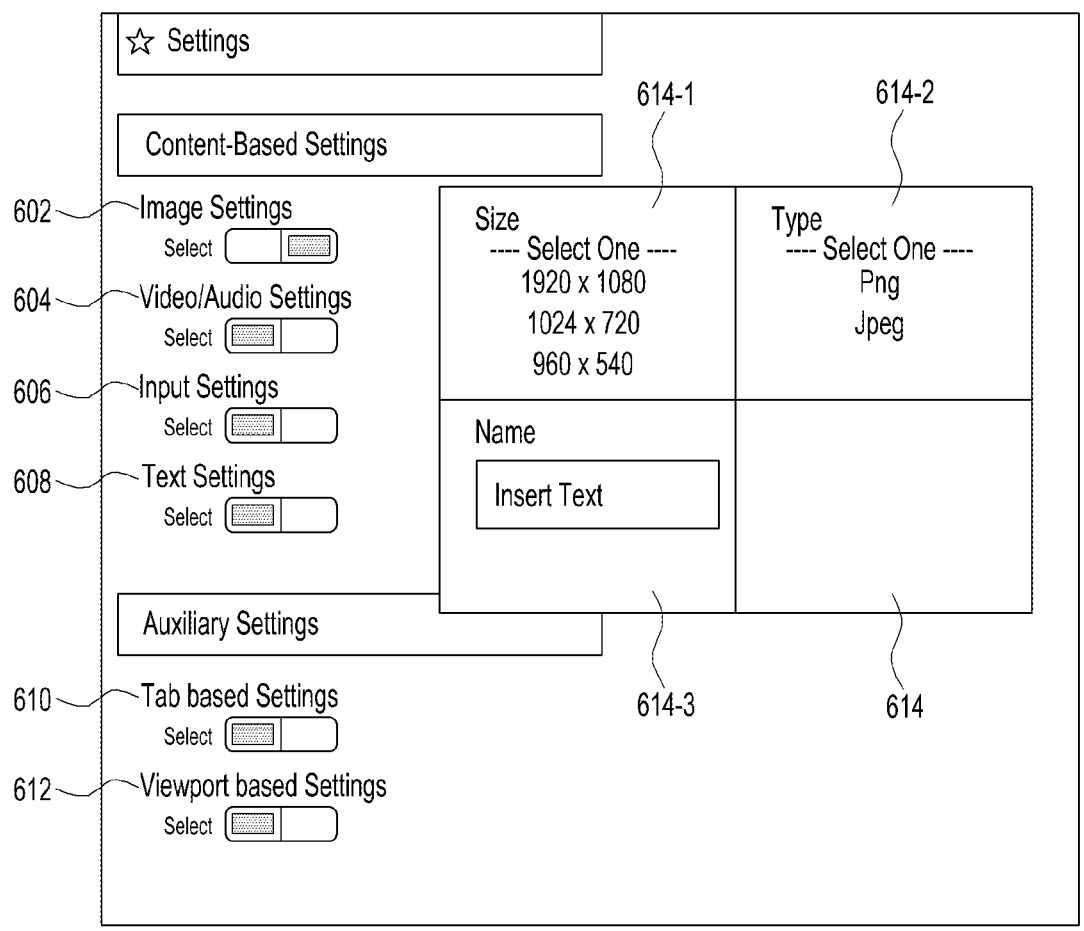
FIG. 6 illustrates an exemplary user interface in accordance with aforesaid embodiments of the disclosure.

FIG. 6 illustrates an exemplary user interface 600 in accordance with both embodiments of the present disclosure, wherein the user interface 600 is a graphical user interface (GUI) to enable the user in using the filter selective module 202 for defining various content setting based criteria or filter.

The GUI 600 may be implemented as a pop up window that is displayed when the user wants to operate upon the filter selective module 202 and provide specific parameters for navigation of the cursor ring across the different elements of the web-page. The user input for navigation settings can be received through the GUI, once the web-page has been loaded. Accordingly, the user may request for activation of the GUI in the web browser window and configure navigation options through the GUI. However, GUI may also be activated while the browser window is yet to load any web-page.

In another example, the GUI may be displayed (say as a pop-up message) even without user actuation. When a web page loads based on a provided website address, the filter selective module 202 automatically identifies type of elements existing in the web page. Based on such identification, the GUI is automatically displayed with options to be exercised by the user for navigation. In yet another example, the GUI may display a list of settings based upon sensing a historical navigation of the user and seek user's affirmation or further customization.

The GUI can be divided into two parts—Content Settings and Auxiliary Settings. The content settings comprise of further sub categories:—
 a) Major Selection
 b) Minor Selection The category 'Major Selection' includes a high level data/content selection like image, audio, video, multimedia, text and hyperlink. The major selection may be referred as defining an element setting. Under each of these high level sections, there are minor selections that may be referred as defining element attribute setting.

For example, a high level selection 'image settings' 602 is meant for navigating across 'image' based focusable nodes in the web-page. Upon such selection of such image settings

602, a separate pop-up window acting as a sub-GUI 614 gets displayed. Such sub-GUI 614 includes various selectable sub-options 614-1, 614-2, 614-3 that may be depicted under the category of minor selections. These sub-options may denote:

a. Size as depicted by 614-1:—Under this minor selection, the user may select navigation to be based on specific size of images. In an example as depicted in the FIG. 6, an image size of 1024×720 has been depicted as selected.

b. Type as depicted by 614-2:—Under this minor selection, the user can select navigation to be based on specific type of images (png, jpg etc.).

c. Name as depicted by 614-3:—Under this minor selection, the user can select navigation to be based on images having some text in name or metadata of image. For such purposes, a text box field has been depicted to request the user for entering text. For example, "insert text" as written in the text-box field represents a request.

For clarity, an example may be considered over here. For example, the user may have selected image settings 602 as a high level or major selection and further wishes to navigate through images having 'name/metadata with Taj-mahal only' as a part of minor selection settings.

In another example, a high level selection 'video settings' 604 is meant for navigating across 'video' based focusable nodes in the web-page. Upon such selection of such video settings 604, a separate pop-up window acting as another sub-GUI may be displayed and include various specific sub-options that may be depicted under the category of minor selections. These sub-options may denote:

a. Size:—User can select navigation to a specific size of videos (e.g. 1920×1080).

b. Type:—User can select navigation to specific type of videos (e.g. fly, mpeg3, mp4 etc.)

c. Name:—User can select navigation to videos having some text in name or metadata of video.

For clarity, an example may be considered over here. In case user has selected "videos settings" 604 as a high level selection, the user may further specify that he wishes to navigate through videos having 'name/metadata with Taj-mahal only' as a part of providing minor selection.

In another example, a high level selection that is 'input settings' 606 is meant for navigating across "input receiving element" based focusable nodes in the web-page. Examples include 'text boxes', 'cheque box", "radio buttons", "drop boxes" etc. Upon such selection of such 'input settings' 606, a separate pop-up window acting as another sub-GUI may be displayed and include various specific sub-options that may be depicted under the category of minor selections. These sub-options may denote:

a. Characteristics:—User can select navigation for specific type of input receiving elements based on whether a typing effort is required from the user (in case of a text box) or there may be pre-defined options that may be selected as input through a control e.g. Cheque box, Radio button, Drop box etc.

b. Size:—User can select navigation for specific type of size of input receiving elements.

In another example, a high level selection 'text settings' 608 is meant for navigating across 'anchor text' based focusable nodes in the web-page. Upon such selection of such text settings 608, a separate pop-up window acting as yet another sub-GUI may be displayed and include various specific sub-options that may be depicted under the category of minor selections. These sub-options may denote:

a. Font:—User can select navigation for specific type of font (e.g. Calibri, Times New Roman)

b. Size:—User can select navigation for specific type of size.

Further, Auxiliary Settings denote settings that are non-content setting and rather pertain to the browser-window characteristics. These settings may be defined as:

a) Tab Based Navigation setting as denoted by 610 b) Viewport Based Navigation setting as denoted by 612

As understood, these settings 610, 612 are independent of the selection of web-element or focusable nodes within the web-page and can be selected alongside content-settings or even without selecting the content-settings. The view port based navigation setting 612 allows the user to navigate from one viewport to another viewport within a single web-page and is helpful in case the loaded web-page is too large in length or breadth and otherwise requires frequent scrolling to traverse the desired focusable nodes of the entire web-page. On the other hand, the tab-based navigation setting 610 allows the user to automatically navigate through the focusable nodes of all of the multiple tabs that are currently active. More specifically, under the tab based navigation, the cursor ring can be automatically transferred to the next-in-sequence tab, once the last focusable node of the current tab has been traversed and user still wishes to pursue the navigation. Both of these settings 610, 612 have been later elaborated in the forthcoming figures.

Further, there may be additional options in the GUI that enable a simultaneous highlighting of a pre-determined number of nodes (or a group of nodes) in web-page that satisfy the content setting based criterion. Accordingly, navigation in such a scenario will result in shifting the cursor ring from one group of focusable nodes to another group of focusable nodes that meet the criteria.

The auxiliary settings have been further illustrated exemplarily later in the current description. Further, once the content settings and/or ancillary settings have been selected by the user, the user saves such desired configuration through the GUI. The setting may get saved in the form of a data representation or a data structure (Filter_Data_Structure) 700 as illustrated FIG. 7, and accordingly become available to a data processing unit (not shown in the figures), which supports the operation of the system 200. The data processing unit allocates memory for the storage of the content settings and auxiliary settings in the single data structure. The processing unit also appends a particular tab ID to the data structure, wherein the tab ID corresponds to a tab identifier of the particular web-page, wherein navigation will have to be performed based on the content settings and auxiliary settings. Whenever the content or auxiliary settings are updated with respect to particular tab ID, a new data structure may be created and override the existing data structure.

Finally, when the data structure has been created, the filter selective module 202 notifies the navigation module 204 regarding the availability of filter data so that the navigation over the web-page may accordingly proceed.

Figure 8:
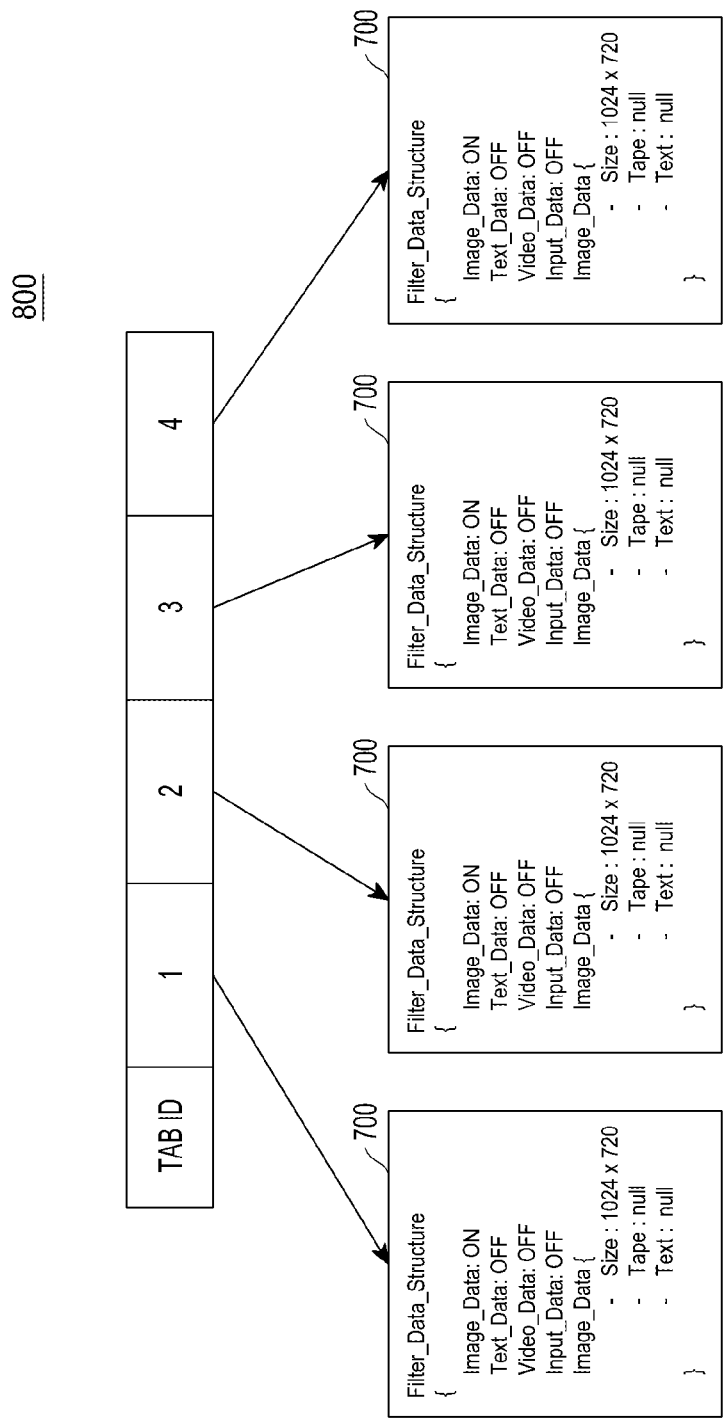
FIG. 8 illustrates a data representation which is referred during navigation, in accordance with both embodiments of the present subject matter.

FIG. 8 illustrates an exemplary data representation 800 derived from data representation described in FIG. 7, wherein such derived data representation is referred by the navigation module 204 during operation. In other implementation, the present navigation module 204 may in fact work in tandem with a default navigation module within a web browser engine and accordingly determine the relevant focusable nodes from the list of cached nodes.

The present navigation module 204 maintains a map (that corresponds to data representation 800) including a tab id as key and a corresponding Filter_Data_Structure 700 as its value. Initially, when there is a single open tab in the browser, there will be one key-value pair in the map. By default, the map depicted in present figure would have all the values corresponding to the key or tab id set to null, thereby depicting a default navigation criteria of the web-browser. However, the values in the map corresponding to a tab ID get updated, every time a new Filter_Data_Structure 700 is created by the Filter Selective module 202 as illustrated in FIG. 7 and FIG. 8. Specifically, the tab id corresponding to which the data structure has been created is searched in the map. Upon having located the desired tab id therein, its value is updated by the newly created Filter_Data_Structure 700. When the id is not found in the existing map, then a new entry may be created within the map with a new tab id and a corresponding value based on the created data structure.

Further, whenever any tab is closed by the user during the navigation operation, then the corresponding tab id and associated value (default or updated) is also deleted from the map. If any of the active tab is refreshed, then there is a probability that newly loaded web-page element may comprise different web-page elements and then before. Accordingly, the user may be provided an option to operate once again upon the user interface 600 and create a new Filter Data Structure 700, based on which the values of the concerned tab id's in the map may be updated.

Further, during the course of the navigation as executed by the present navigation module 204, the present navigation module 204 interacts with a default navigation module of the web-browser engine. As it is known, a cached node/focusable node in the web-engine also maintains a default data structure in respect of the active tab id. Accordingly, during the course of navigation when a next focusable node is to be searched by the navigation module 204 from the list of cached nodes, the values associated with tab id in the map are matched with the cached node data structure. For example, in case the value in the map contains 'Image' as a 'major selection' based content setting (i.e. Image_Data: ON) and a corresponding minor selection based content setting as being Size=1024×720, only those cached nodes are eligible for navigation (in the corresponding tab Id) that are of 'image' type and of Size 1024×720. Such exemplary major and minor selection of content settings has been already illustrated in the user interface 600 depicted in FIG. 6.

Overall, it may be deduced from the present figure that in addition to a conventional criteria (i.e. spatial-overlap) of navigation that is pursued in web-browsers, the present subject matter at least provides content settings as the additional criteria to be met. As will be evident from the forthcoming figures, auxiliary setting based criteria may also be added alongside the content settings based criteria as the additional criteria.

Figure 9:
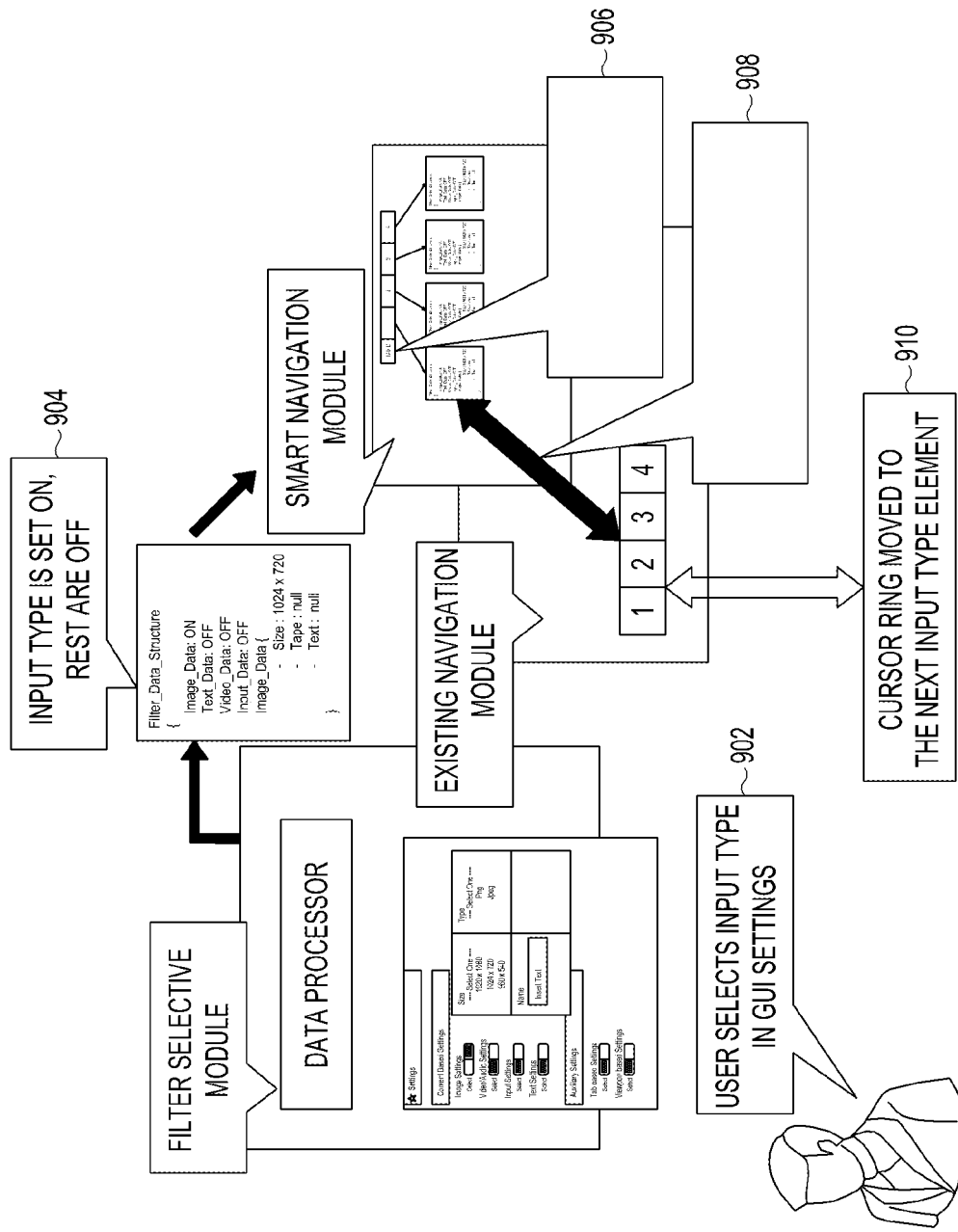
FIG. 9 illustrates a pictorial representation of the exemplary operations applicable in respect of FIG. 6 to 8.

FIG. 9 illustrates a pictorial representation of the exemplary operations applicable in respect of the filter selective module 202. GUL and the present navigation module 204 as covered in FIG. 6 to 8.

Steps 902 and 904 corresponding to the user performed operations through the GUI as facilitated by the filter selective module 202. In an example. "input data" has been chosen as content setting so to reach only the text boxes as a part of navigation over the web-page. Accordingly, step 904 gives rise to a corresponding data structure that has been referred in FIG. 7. The present steps 902 depicts an operation performed over the filter selective module 202, while step 904 depicts and operation performed by the filter selective module 202.

Step 906 depicts update of values associated with a particular tab id in the map (as referred in FIG. 8) based on the new data structure created in step 904. The present step 906 accordingly depict an operation performed by the navigation module 202.

Step 908 depicts accessing a list of cached nodes related to the current tab from an existing navigation module that may be located inside the web-engine for comparing their data structure with the corresponding values in the map.

Step 910 depicts transferring the cursor ring to a next input element (for example text box) in the web-page based upon a favourable-result obtained as a result of comparison done in step 908. The present steps 908 and 910 accordingly depict an operation performed by the navigation module 204.

Figure 10:
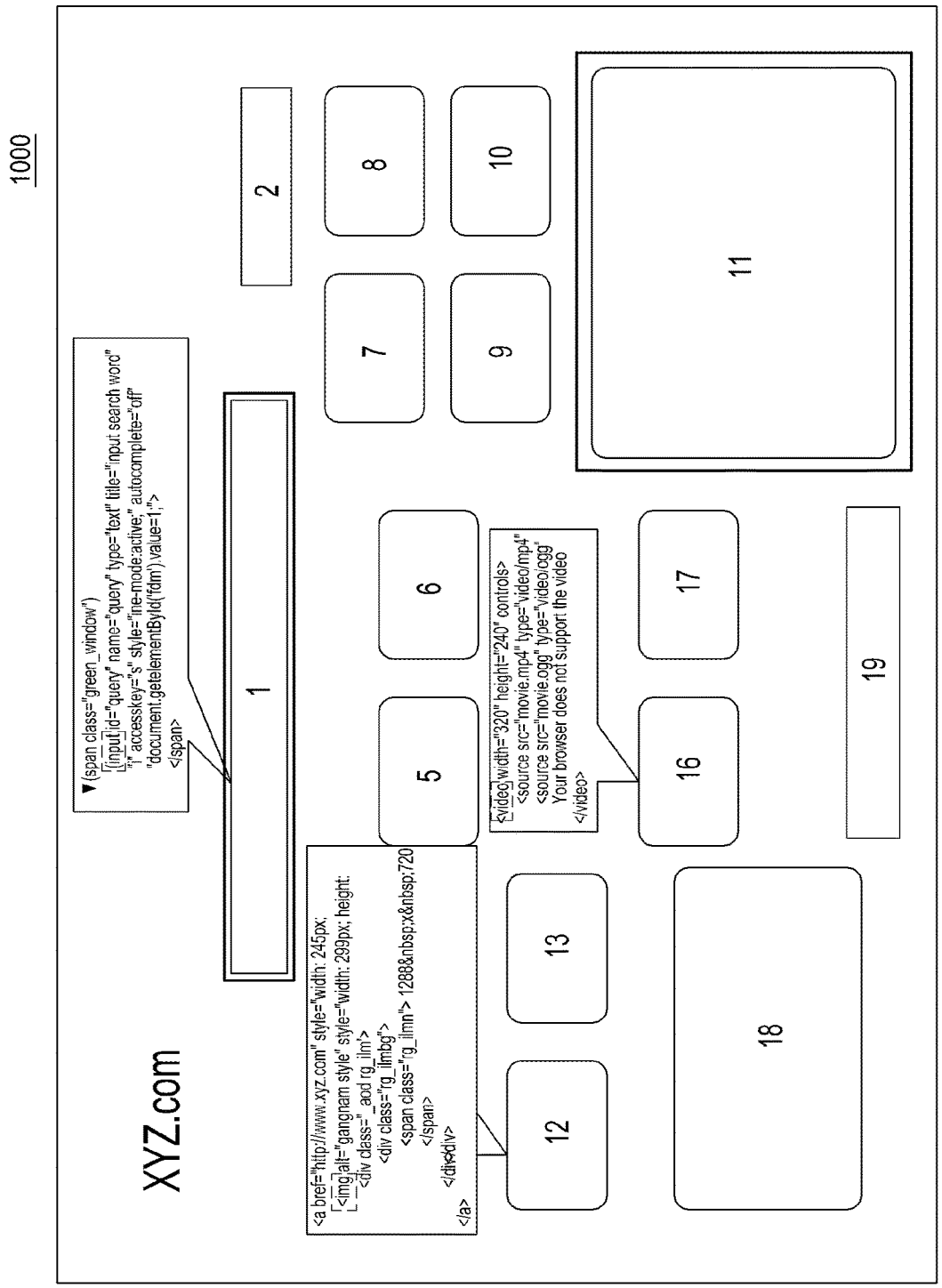
FIG. 10 illustrates an outcome of the operation in FIG. 9, based on an exemplary type of user-input.

The arrival of the cursor ring at the next found focusable elements has been pictorially represented in FIG. 10, where it is clear that the navigation module 204 is able to bypass many intervening nodes that are otherwise focusable to directly highlight the text box at the bottom of web-page.

FIG. 10 illustrates an outcome of the exemplary operation in FIG. 9, based on a specific user-input. The web-page 1000 as depicted shows the content of each type of element in the page. Each element is represented by a specific HTML tag along with the attributes of that tag. As discussed already, the existing navigation module in the web-engine stores all the focusable nodes that have been numbered 1 to 19 in a cached list. Some of the focusable nodes (such as 1, 12, 16) and their attributes have been enlarged and shown in present figure. For example, Node 1 is Input type of element and represented by <input>, while Node 12 is of type image inside an anchor tag and is represented by <img> tag. Embedded video type of element is represented by node 16 and represented by <video>.

As the user selects a filter from the GUI to navigate specifically through 'Input receiving' type elements in the web-page, the input data is processed by the data processing unit and the Input_Data field is set ON in the Filter_Data_ Structure 700. Rest of the data fields are set to OFF value. This structure 700 is passed to the navigation nodule 204 which may also operate as a sub module of a default navigation module in the web-browser engine. As the present figure depicts existence of a single tab in the browser window, so the Filter_Data_Structure 700 corresponds to a a sole tab id say tab id 1. Accordingly, the value in the map is updated in accordance with the Filter_Data_Structure in respect of the tab id 1.

Now, when an first navigational command is received from the user, the cursor ring highlights Node 1 (text box) for being the "input receiving" element. Thereafter, a downward direction may be provided by the user as a navigational command, through an arrow key present within the keyboard. Since, the next focusable node in the cache list maintained by the existing navigation module is Node 2, the existing navigation module is queried to determine if this node 2 satisfies the Filter data structure value. As the type of node 2 may be actually a hyperlink rather than being an "Input receiving" node, the node 2 gets neglected. The lookout for the relevant focusable node continues till node 11 that satisfies the "Input" type criterion. So, the node 11 gets selected the cursor ring is positioned around node 11. Thus, it may be observed that irrelevant nodes in cached list have been bypassed based on their different content settings and an otherwise mandatory traversal of all the intervening focusable nodes is avoided.

Figure 11:
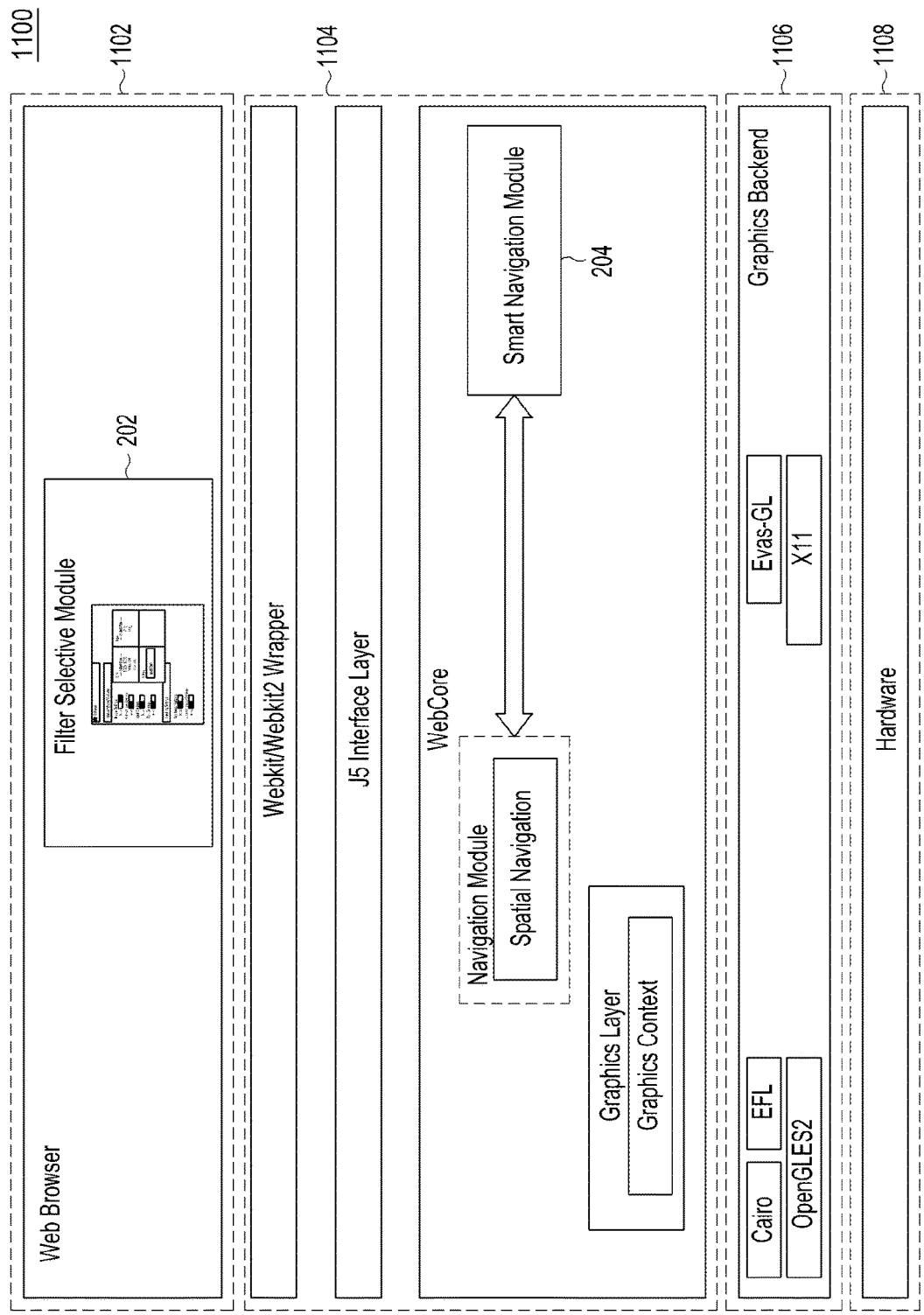
FIG. 11 illustrates a detailed architecture of the system illustrated in FIG. 2.

FIG. 11 illustrates a detailed architecture 1100 of the system illustrated in FIG. 2. As evident from the figure, the filter selective module 202 may be implemented as a part of the web-browser application 1102 that accesses requested website data (i.e. HTML. XML, image files) from a remotely located server. On other hand, the navigation module 204 forms a part of web-kit module 1104 that is a layout engine (or a web-browser engine) for rendering the accessed website data accessed in the browser window. Accordingly, the present navigation module 204 interacts with the default navigation module in the web-browser engine. However, apart from Web-kit, other type of web-browser engines for rendering web pages are also conceivable to incorporate the present navigation module 204.

Further, the Graphics Backend 1106 is a collection of programming libraries such as Cairo, EFL and OpenGLES2 that work in conjunction with windowing systems such as X11 and application programming interface such as Evas-GL for rendering graphics as a part of the rendering of web-pages by the web-browser engine.

Further, various hardware elements 1108 that execute the operation of web browser in tandem with the present system 200 include processors for executing various application, memory for at least storing data structures and key maps, an input unit to operate upon the GUI as well to navigate upon the rendered web-pages, and a display device. Such hardware implementation has been further elaborated in the forthcoming figure.

Figure 12:
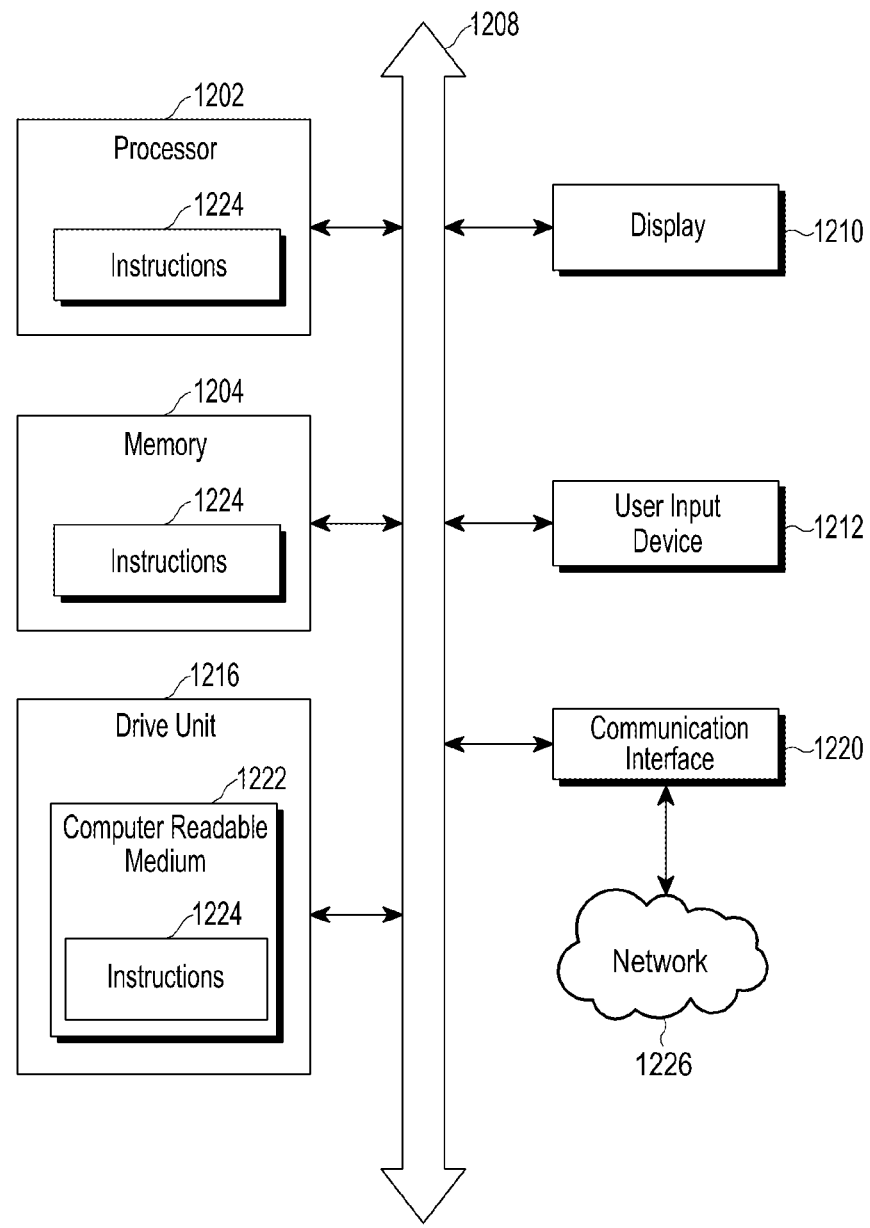
FIG. 12 illustrates an implementation of the system illustrated in FIG. 2 in a computing environment.

FIG. 12 illustrates an implementation of the system illustrated in FIG. 2 in a computing environment. The present figure essentially illustrates the hardware configuration of the system 200 in the form of a computer system 1200 is shown. The computer system 1200 can include a set of instructions that can be executed to cause the computer system 1200 to perform any one or more of the methods disclosed. The computer system 1200 may operate as a standalone device or may be connected, e.g., using a network, to other computer systems or peripheral devices.

In a networked deployment, the computer system 1200 may operate in the capacity of a server or as a client user computer in a server-client user network environment, or as a peer computer system in a peer-to-peer (or distributed) network environment. The computer system 1200 can also be implemented as or incorporated into various devices, such as a personal computer (PC), a tablet PC, a personal digital assistant (PDA), a mobile device, a palmtop computer, a laptop computer, a desktop computer, a communications device, a wireless telephone, a land-line telephone, a web appliance, a network router, switch or bridge, or any other machine capable of executing a set of instructions (sequential or otherwise) that specify actions to be taken by that machine. Further, while a single computer system 1200 is illustrated, the term "system" shall also be taken to include any collection of systems or sub-systems that individually or jointly execute a set, or multiple sets, of instructions to perform one or more computer functions.

The computer system 1200 may include a processor 1202 (e.g., a central processing unit (CPU), a graphics processing unit (GPU), or both. The processor 1202 may be a component in a variety of systems. For example, the processor 1202 may be part of a standard personal computer or a workstation. The processor 1202 may be one or more general processors, digital signal processors, application specific integrated circuits, field programmable gate arrays, servers, networks, digital circuits, analog circuits, combinations thereof, or other now known or later developed devices for analysing and processing data. The processor 1202 may implement a software program, such as code generated manually (i.e., programmed).

The computer system 1200 may include a memory 1204, such as a memory 1204 that can communicate via a bus 1208. The memory 1204 may be a main memory, a static memory, or a dynamic memory. The memory 1204 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 1204 includes a cache or random access memory for the processor 1202. In alternative examples, the memory 1204 is separate from the processor 1202, such as a cache memory of a processor, the system memory, or other memory. The memory 1204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 1204 is operable to store instructions executable by the processor 1202. The functions, acts or tasks illustrated in the figures or described may be performed by the programmed processor 1202 executing the instructions stored in the memory 1204. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 1200 may or may not further include a display unit 1210, such as a liquid crystal display (LCD), an organic light emitting diode (OLED), a flat panel display, a solid state display, a cathode ray tube (CRT), a projector, a printer or other now known or later developed display device for outputting determined information. The display 1210 may act as an interface for the user to see the functioning of the processor 1202, or specifically as an interface with the software stored in the memory 1204 or in the drive unit 1216.

Additionally, the computer system 1200 may include an input device 1212 configured to allow a user to interact with any of the components of system 1200. The input device 1212 may be a number pad, a keyboard, or a cursor control device, such as a mouse, or a joystick, touch screen display, remote control or any other device operative to interact with the computer system 1200.

The computer system 1200 may also include a disk or optical drive unit 1216. The disk drive unit 1216 may include a computer-readable medium 1222 in which one or more sets of instructions 1224, e.g. software, can be embedded. Further, the instructions 1224 may embody one or more of the methods or logic as described. In a particular example, the instructions 1224 may reside completely, or at least partially, within the memory 1204 or within the processor 1202 during execution by the computer system 1200. The memory 1204 and the processor 1202 also may include computer-readable media as discussed above.

The present disclosure contemplates a computer-readable medium that includes instructions 1224 or receives and executes instructions 1224 responsive to a propagated signal so that a device connected to a network 1226 can communicate voice, video, audio, images or any other data over the network 1226. Further, the instructions 1224 may be transmitted or received over the network 1226 via a communication port or interface 1220 or using a bus 1208. The communication port or interface 1220 may be a part of the processor 1202 or may be a separate component. The communication port 1220 may be created in software or may be a physical connection in hardware. The communication port 1220 may be configured to connect with a network 1226, external media, the display 1210, or any other components in system 1200 or combinations thereof. The connection with the network 1226 may be a physical connection, such as a wired Ethernet connection or may be established wirelessly as discussed later. Likewise, the additional connections with other components of the system 1200 may be physical connections or may be established wirelessly. The network 1226 may alternatively be directly connected to the bus 1208.

The network 1226 may include wired networks, wireless networks, Ethernet AVB networks, or combinations thereof. The wireless network may be a cellular telephone network, an 802.11, 802.16, 802.20, 802.1Q or WiMax network. Further, the network 1226 may be a public network, such as the Internet, a private network, such as an intranet, or combinations thereof, and may utilize a variety of networking protocols now available or later developed including, but not limited to TCP/IP based networking protocols.

In an alternative example, dedicated hardware implementations, such as application specific integrated circuits, programmable logic arrays and other hardware devices, can be constructed to implement various parts of the system 1200.

Applications that may include the systems can broadly include a variety of electronic and computer systems. One or more examples described may implement functions using two or more specific interconnected hardware modules or devices with related control and data signals that can be communicated between and through the modules, or as portions of an application-specific integrated circuit. Accordingly, the present system encompasses software, firmware, and hardware implementations.

The system described may be implemented by software programs executable by a computer system. Further, in a non-limited example, implementations can include distributed processing, component/object distributed processing, and parallel processing. Alternatively, virtual computer system processing can be constructed to implement various parts of the system.

The system is not limited to operation with any particular standards and protocols. For example, standards for Internet and other packet switched network transmission (e.g., TCP/IP, UDP/IP, HTML, HTTP) may be used. Such standards are periodically superseded by faster or more efficient equivalents having essentially the same functions. Accordingly, replacement standards and protocols having the same or similar functions as those disclosed are considered equivalents thereof.

In the following paragraphs, a detailed description about exemplary application of various features of the present disclosure has been provided for better understanding. It should however be understood that application of the present disclosure shall not be considered as being only restricted to the following use cases.

Figure 13:
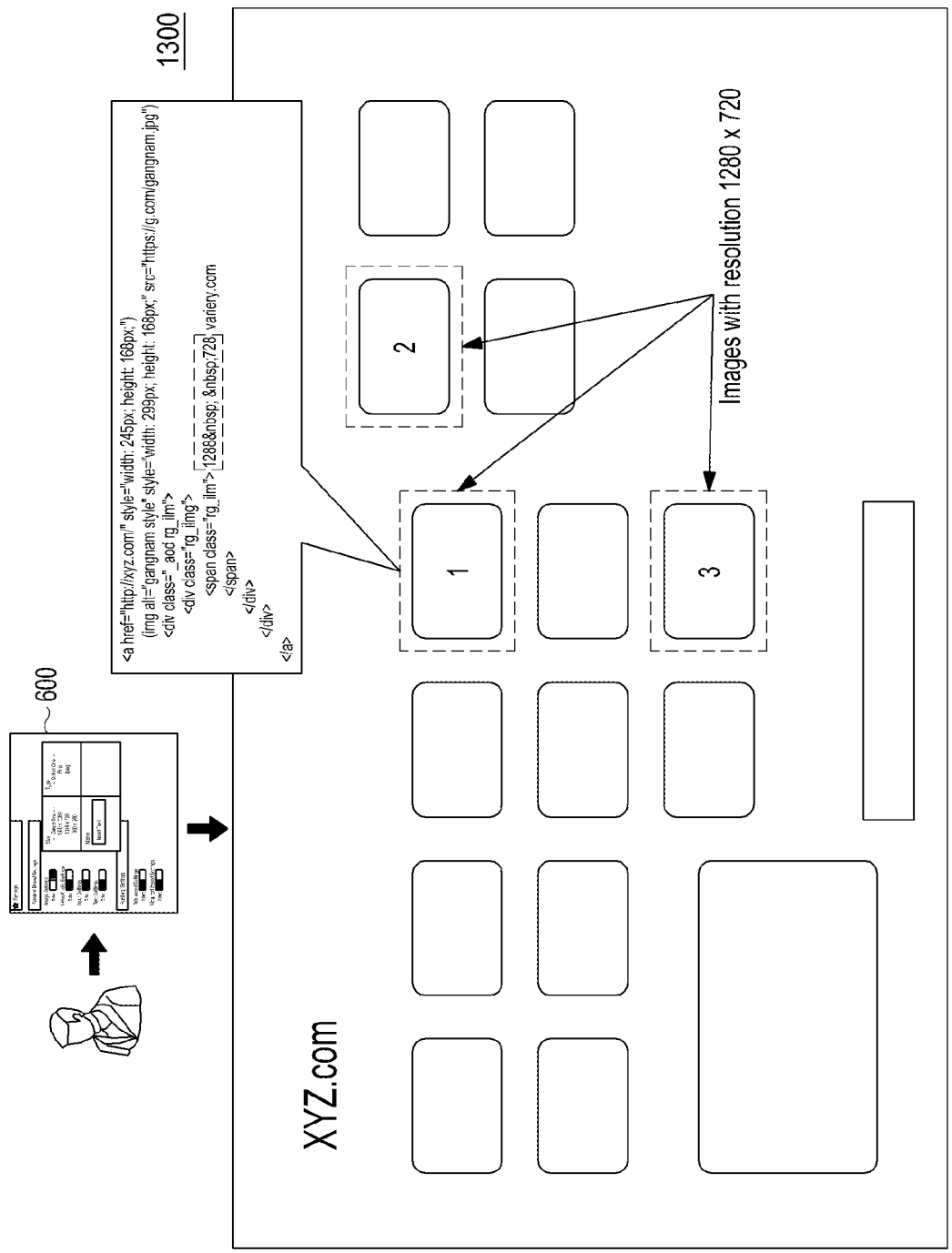
FIG. 13 illustrates a navigation of the web-page based on resolution of the image based web-elements, in accordance with the present disclosure.

FIG. 13 illustrates a navigation of the web-page 1300 based on a resolution (i.e. element attribute setting) of the image based web-elements (i.e. element setting), in accordance with the present disclosure. The same also corresponds to selection of "image settings" 602 from the GUI 600.

The objective behind the navigation as proposed in the present figure is to navigate from one image element to another image element through the webpage 1300. Examples of element attribute setting in context of the image as the 'element setting' include image size, image resolution, image name, image type. Accordingly, providing an image attribute by the user through the GUI 600 denotes that navigation is intended from one image element having a particular attribute (say image size) to another image element having similar attribute (similar image size). Similar proposition applies to other element attribute setting such as image resolution, image name, image type (i.e. image format).

In an example, once the user selects 'image type' and 'a specific resolution' as the filter, the filter selective module passes this information to the navigation module 204. The navigation module 204 checks if a next specified focusable node is an image. If yes, then its resolution is ascertained and compared with the criteria. Only if the both criteria are met, then the focusable node under observation gets highlighted by the cursor ring. Else, it will get bypassed and next focusable node is examined. Accordingly, the cursor ring will keep on highlighting (after every user actuation) only those image based elements that are of a particular resolution, while bypassing the rest of the focusable nodes or web elements.

Now considering the present figure, the images numbered 1, 2, 3 specify relevant focusable nodes having images with resolution 1280×720. Accordingly, the cursor ring will only move among these elements.

Similarly, the user may have selected a specific aspect ratio as element attribute setting while choosing image as the element setting. Accordingly, the filter or the content setting gets defined and navigation is intended for images having a specified aspect ratio. Accordingly, the navigation module 204 checks width and height for every encountered image, calculates an aspect ratio, and compares the aspect ratio with the filter.

Figure 14:
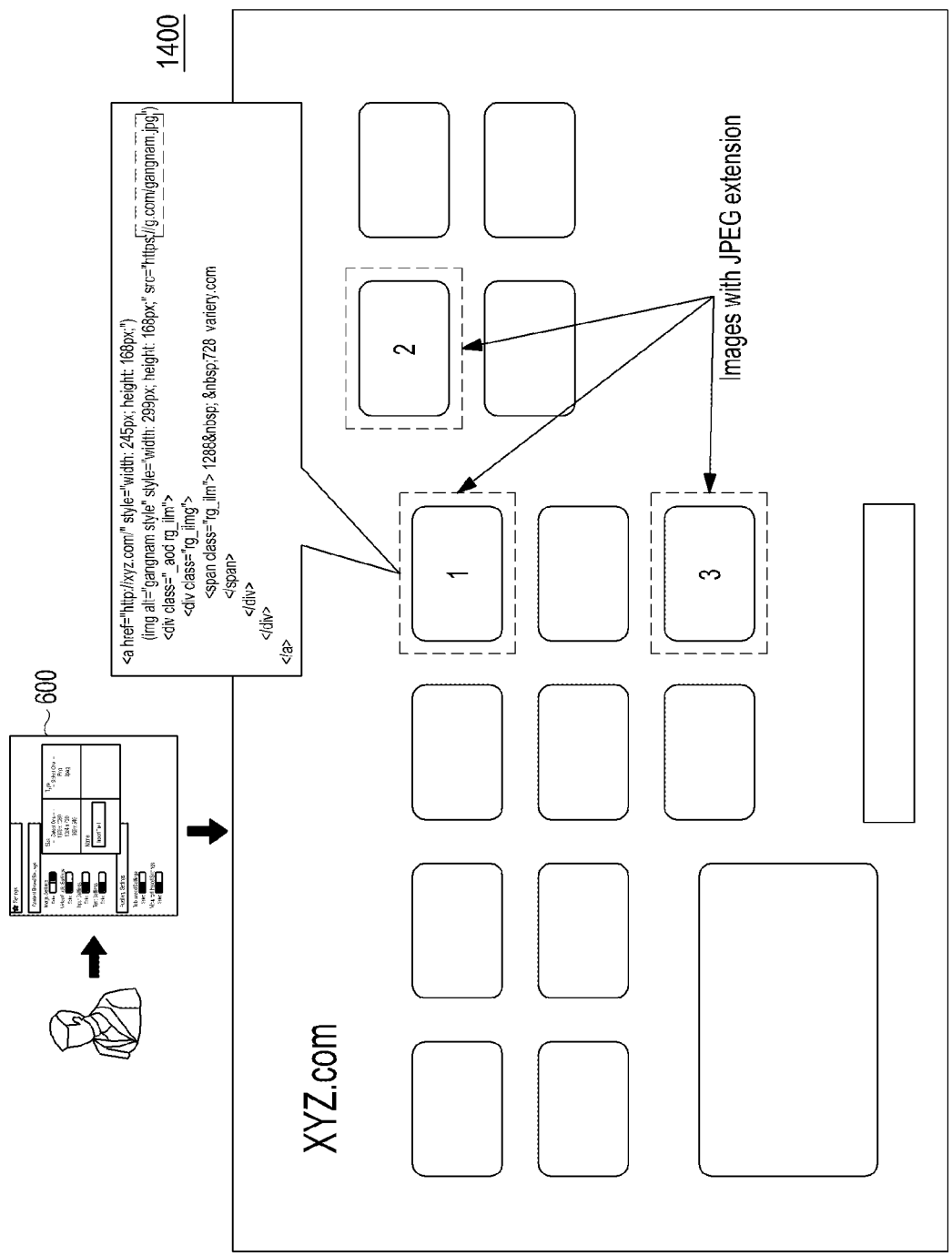
FIG. 14 illustrates a navigation of the web-page based on format of the image based web-elements, in accordance with the present disclosure.

FIG. 14 illustrates a navigation of the web-page 1400 based on 'image type' of the image based web-elements, in accordance with the present disclosure. The same also corresponds to selection of "image settings" 602 from the GUI 600.

Usually, a number of image types are supported by web browser. These types are JPG, PNG, JIF and WEBP. In the present figure, it has been illustrated that the user has selected a filter to navigate through 'jpg format' images only. Accordingly, the navigation module 204 examines existing image based focusable nodes in the web page in terms of their formats or file extensions. Accordingly, the navigation is only enabled among images 1, 2, 3 which are of .jpg format in the present figure.

Likewise, image name or associated metadata can also be used as the element-attribute setting. For example, considering that user has done a prior search for images with text "Seven wonders of world" on a search engine, mixed images associated with all seven wonders of world may be resulted. Yet, the user may only wish to view/download only Taj-Mahal and Tower of Pisa images. Accordingly, the user can select filter for navigation through images having associated keywords as "Taj-Mahal" and "Tower of Pisa". Accordingly, only such images that have image names or meta-data containing the keywords (wholly or partially) are enabled for navigation.

Figure 15:
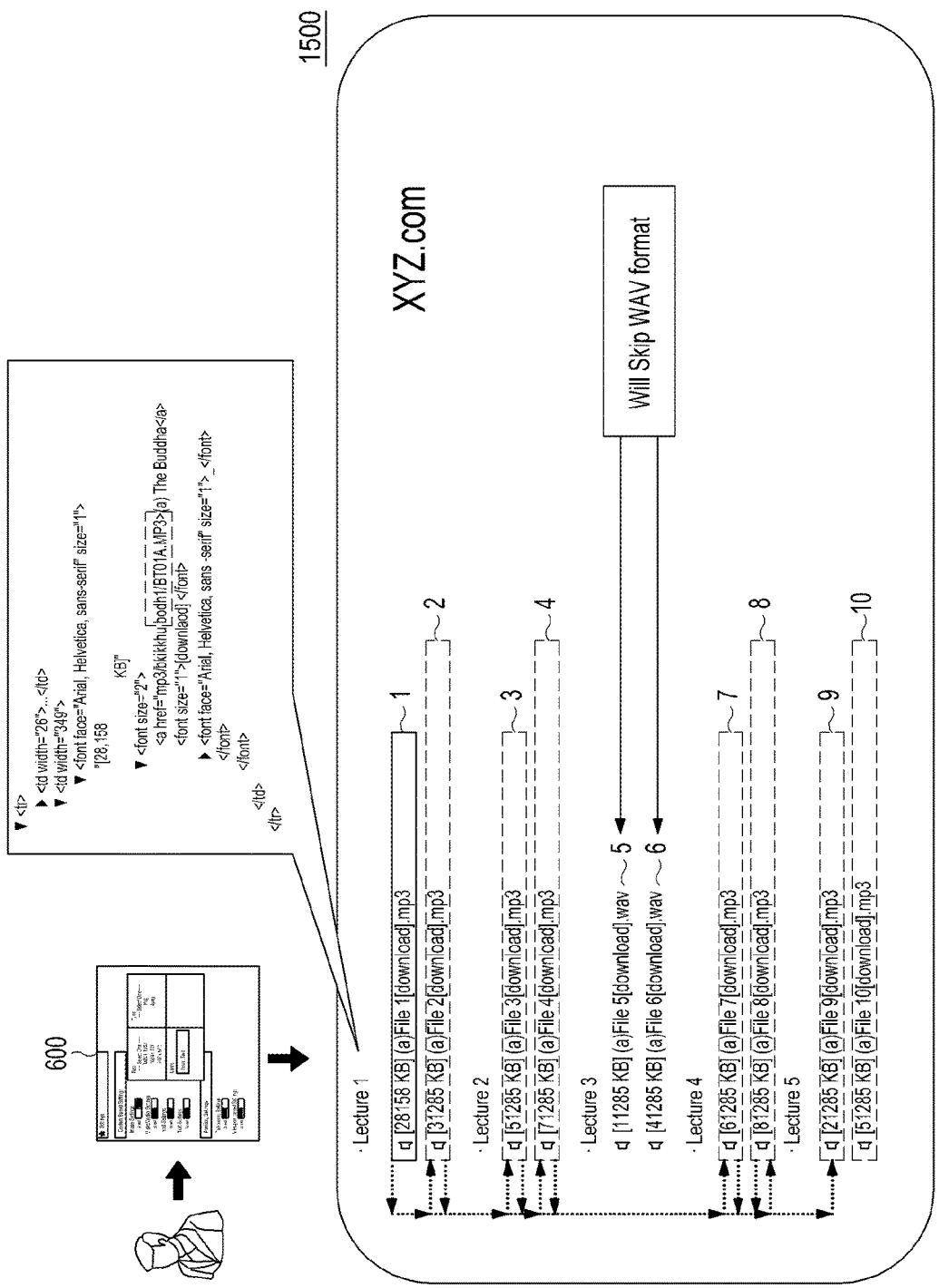
FIG. 15 illustrates a navigation of the web-page based on format of the audio/video web-elements, in accordance with the present disclosure.

FIG. 15 illustrates a navigation of the web-page 1500 based on format of the audio/video web-elements, in accordance with the present disclosure. The same may correspond to selection of "video settings" 604 from the GUI 600.

The objective behind the navigation as proposed in the present figure is to navigate from one audio/video element to another audio/video element through the webpage.

Examples of element attribute setting in context of the audio/video as the 'element setting' include audio size, audio resolution, audio name, audio type, video size, video resolution, video name, video type. Accordingly, providing an audio/video attribute by the user through the GUI 600 denotes that navigation is intended from one audio/video element having a particular attribute (say format) to another audio/video element having similar attribute (similar format). Similar proposition applies to other element attribute setting such as resolution, name, size etc.

Usually a number of audio/video formats are supported by web browser. These are MP3, MP4, wav, OGG, and WEBM. The extension of audio/video files in the web-page can be extracted from a source website that is hosting the audio/video element at the web-page or even from a URL of the audio/video element. In the present figure, the filter criteria is set such that the audio file is an considered as element setting and "mp3" format of the file acts as the element attribute setting. Accordingly, the navigation module 204 will examine 'focusable' audio files within the webpage in terms of their audio file extension. Accordingly, navigation gets enabled only in respect of the "mp3" format based audio files. As shown below in present figure, only the nodes 1, 2, 3, 7, 8, 9 and 10 are the audio elements with mp3 format, while nodes 5 and 6 are of ".wav" format. Accordingly, the other audio files or focusable nodes get bypassed during the navigation. For example, audio files with way format get exempted from being navigation.

Likewise, audio/video elements with a preferred name may be chosen for navigation. For example, considering that user has done a prior search for images with text "Seven wonders of world" on a search engine, mixed audio/video elements associated with all seven wonders of world may be resulted. Yet, the user may only wish to view/download only "Taj-Mahal" and "Tower of Pisa" related audio/video elements. Accordingly, the user can select filter for navigation through audio/video elements having associated keywords as "Taj-Mahal" and "Tower of Pisa". Accordingly, only such audio/video elements that have files names or meta-data containing the keywords (wholly or partially) are enabled for navigation.

The description of present figure may 15 also be expanded to cover a navigation based on selection of multimedia element (e.g. flash work) as the element setting and the multimedia file name, multimedia file size and the multimedia file name as the element attribute setting.

Figure 16:
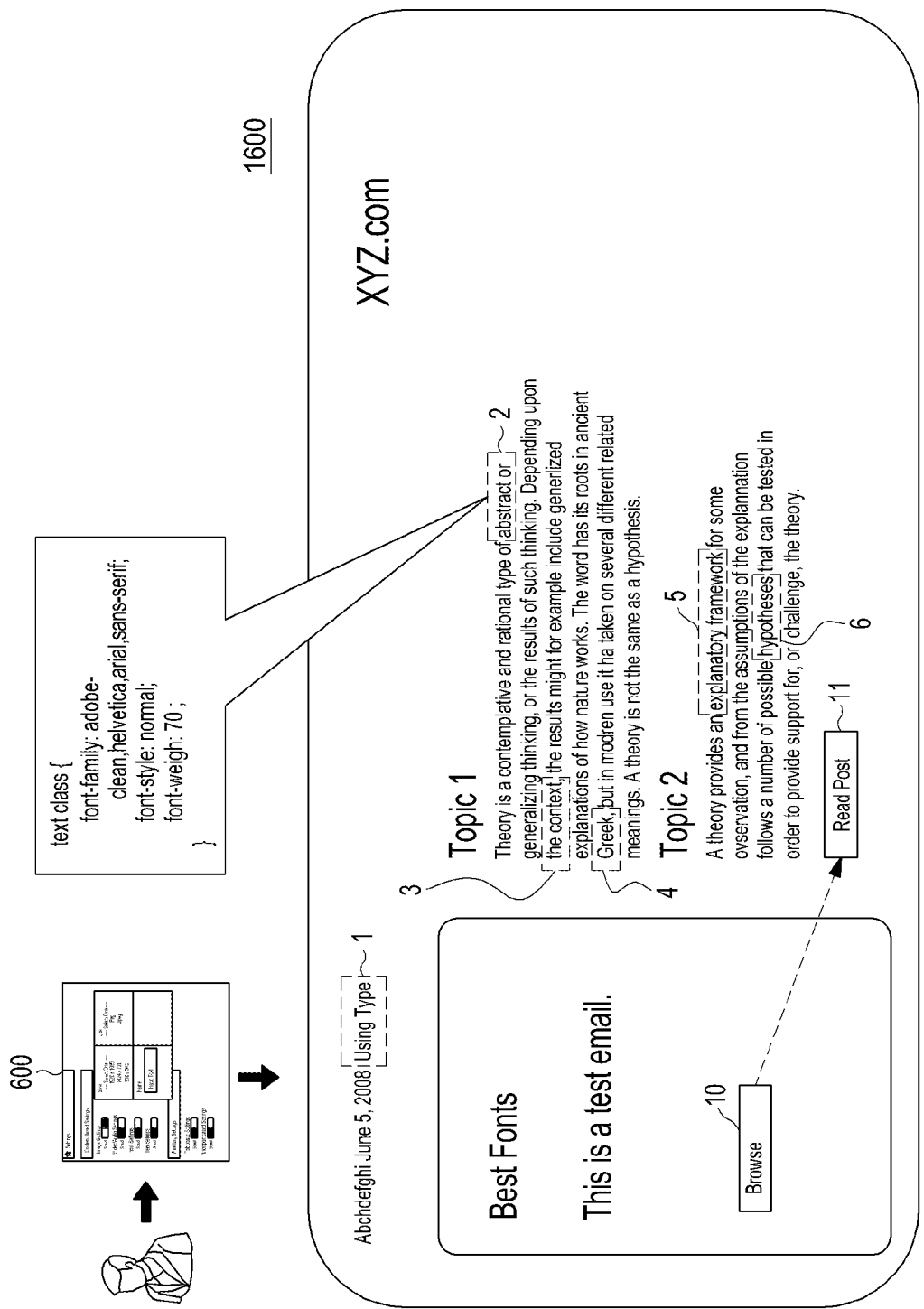
FIG. 16 illustrates a navigation of the web-page based on a font style of the anchor text, in accordance with the present disclosure.

FIG. 16 illustrates an exemplary navigation of the web-page 1600 based on a font style of the anchor text, in accordance with the present disclosure. The same may correspond to selection of "anchor text" 608 from the GUI 600.

The objective behind the navigation as proposed in the present figure is to navigate from one anchor text element to another anchor text element through the webpage. Examples of element attribute setting in context of the anchor text as the 'element setting' include nature of text content, text font, text size, text property. Accordingly, providing an anchor text attribute by the user through the GUI denotes that navigation is intended from one anchor text element having a particular attribute (text property) to another anchor text element having similar attribute (similar property). Similar proposition applies to other element attribute setting such as nature of text content, text font, text size etc.

In an example, the user can set the anchor text with a specific name (i.e. nature of content) as the filter. Accordingly, the navigation executes between among the anchor texts that are known by the name or include the name. Likewise, the user may wish to navigate among the anchor texts in the web-page that are either italic, bold, underlined or with some other specific style property. Accordingly, during the navigation, only the anchor texts with the given style (say italicized) will be traversed.

Now coming to the present figure, the nodes 1, 2, 3, 4, 5, 6 are anchor text elements having same fonts. Accordingly, the navigation module 204 will enable a traversal only among these nodes in case the filter is set for a given font type in respect of the anchor text. Such traversal may follow a sequence based on the numbering of nodes.

Further, the nodes elements 10, 11 as anchor text elements have a same text-property which is different from the nodes 1-6. Accordingly, when the user adopts a different criteria that is based on the text property related to nodes 10 and 11, then navigation may be restricted only between these two type of anchor text elements.

Further, the description of present figure may also be expanded to cover selection of hyperlinks as the element setting and hyper link content and hyperlink type as the element attribute settings.

Figure 17:
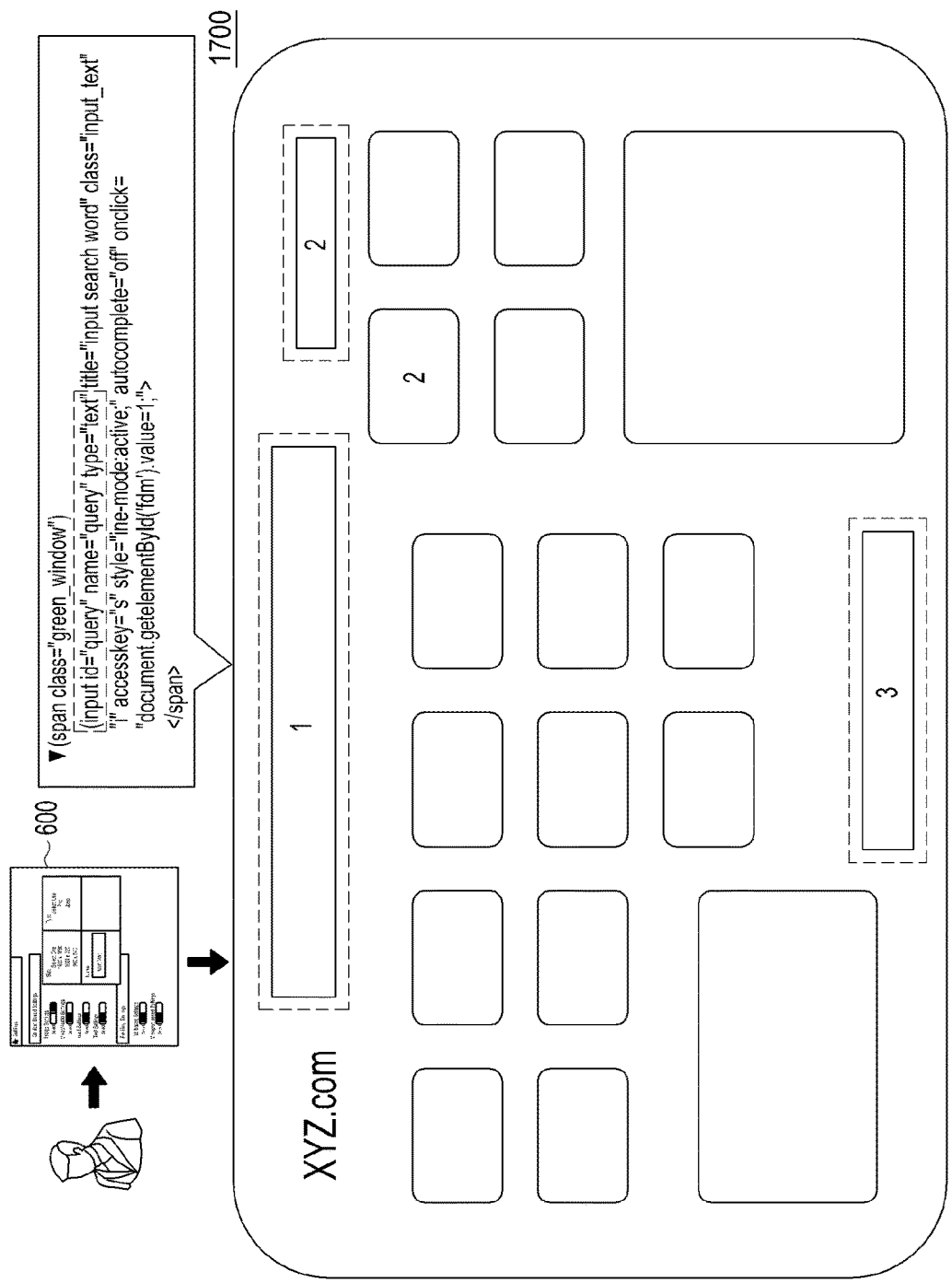
FIG. 17 illustrates a navigation of the web-page based on presence of an input-receiving web-page element, in accordance with the present disclosure.

FIG. 17 illustrates a navigation of the web-page 1700 based on presence of an 'input-receiving' web-page element, in accordance with the present disclosure. The same may correspond to selection of "input settings" 606 from the GUI 600.

The present figure considers a situation where the user is only interested in giving input through a text box, cheque box, radio-button to a Web Page and accordingly wishes to restrict the navigation between these entities to quickly reach an input receiving element. Accordingly, the filter may be set as being "input receiving" element. Accordingly, in the present FIG. 17. 1, 2, 3 are the focusable nodes which belong to the category "input-receiving" elements. So once user selects filter to navigate through input elements only, the navigation module 204 will traverse through 1→2→3 focusable elements only.

FIG. 18 illustrates a viewport-centric navigation of the web-page 1800 based on receipt of a user input, in accordance with the present disclosure. The navigation mode is activated based on user choosing the viewport navigation as auxiliary setting alongside selecting the usual content setting for navigation purposes.

A viewport is understood to define a dimensional area mapped to a position over the source content. The position and dimension of the viewport determine whether entire source content or a portion of the source content (webpage content) is mapped. A region within a user interface window typically contains a viewport window which provides a view through the viewport to the mapped portion of the source content. The dimensions of the viewport window are typically limited to that of the window region the viewport window occupies. The window containing the viewport window usually provides some way for adjusting the position of the viewport over the source content, thereby affecting which portion of the source content is visible in the viewport window. The relationship between viewport and viewport window dimensions is not fixed. The viewport dimensions may be smaller or larger than the viewport window, and accordingly the viewport window might show a scaled version of the viewport mapped source content. If the web page is larger than view port dimension, page becomes scrollable and horizontal and vertical scroll bar are enabled.

Figure 18A:
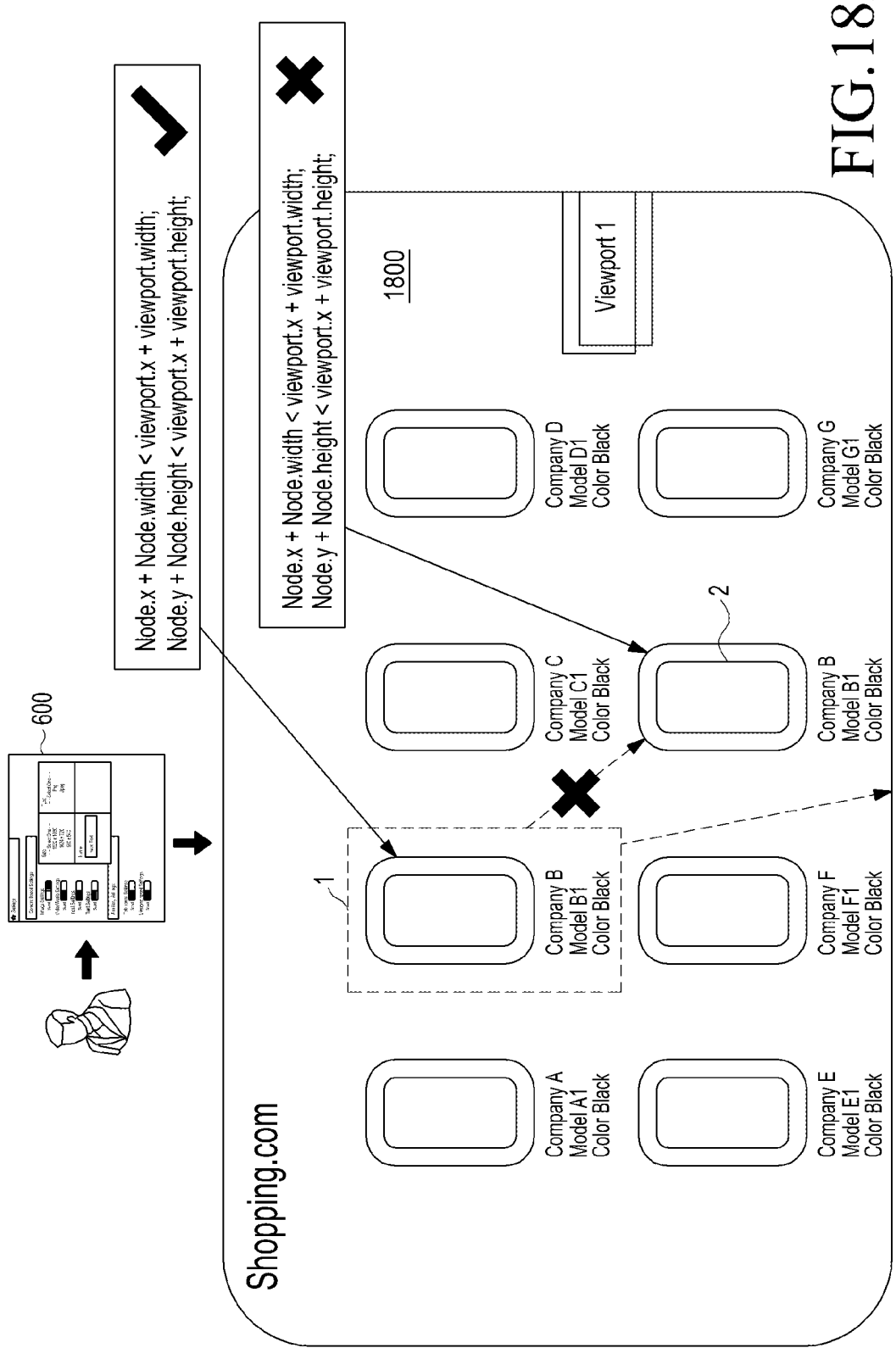
FIG. 18A and FIG. 18B illustrate a viewport-centric navigation of the web-page based on receipt of a user input, in accordance with the present disclosure.
Figure 18B:
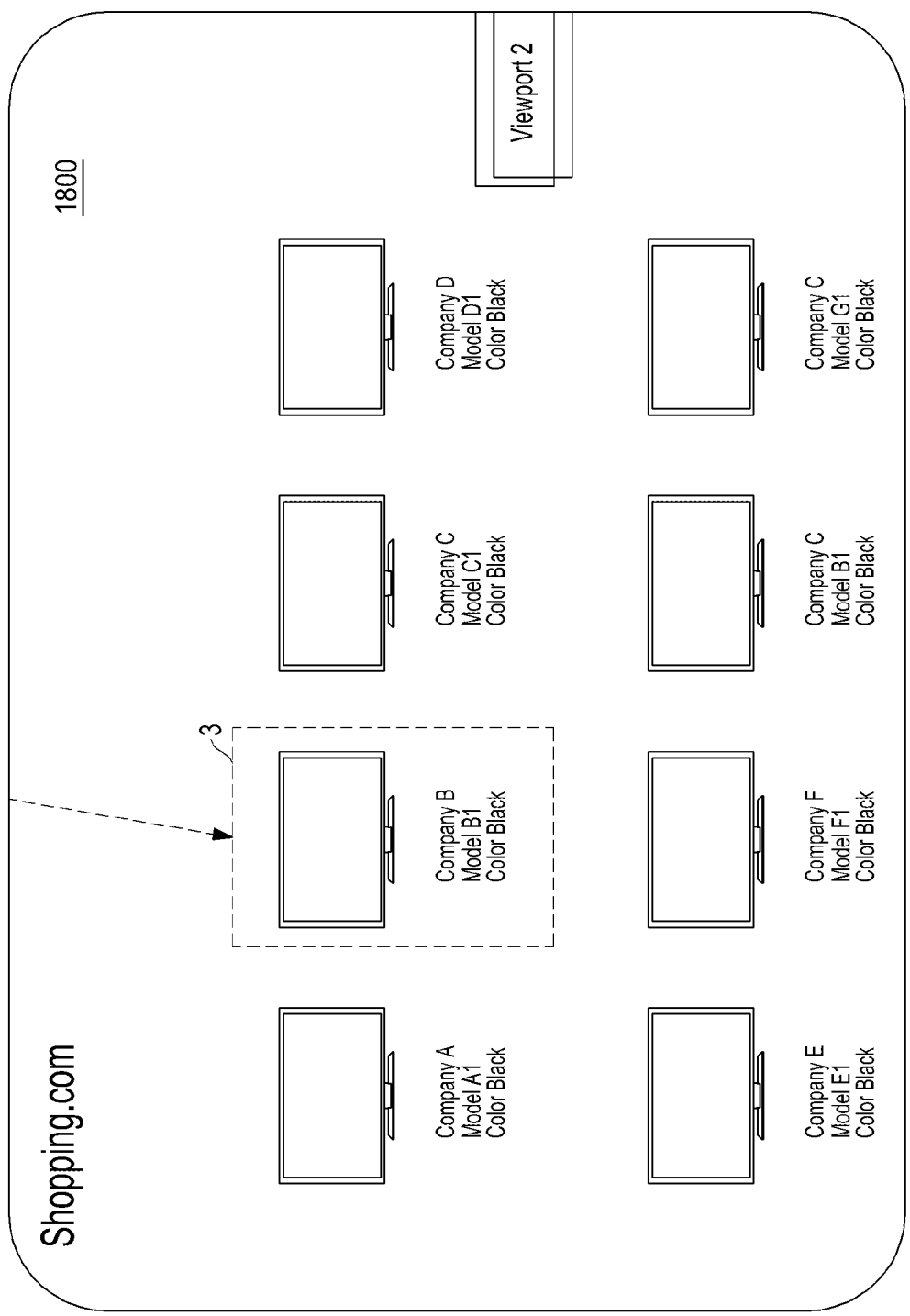

Now coming to the example depicted in present figure that covers FIG. 18A and FIG. 18B, a first viewport or viewport 1 as depicted in FIG. 18A shows a certain portion of website wherein products of different manufacturers or companies have been displayed for sale online. Accordingly, user can compare his preferred-brand of product along with other rival-brands to compare prices, features etc before making a final decision of purchase. While doing aforethe comparisons, the user has the following options for navigation between the depicted products:

1) If user selects the content setting based filter as "Company A" to only navigate among such products that have "Company A" associated as the name (e.g. name of manufacturer), then the navigation will proceed accordingly as described in preceding figures. Accordingly, each focusable node in viewport 1 that fulfils the criteria may get highlighted upon every user provided navigation command and viewport 2, which is depicted in FIG. 18B, can only be reached when traversal across all the focusable and criteria meeting nodes in viewport 1 has been completed.

2) To further expedite the present "filter" based navigation, the current example proposes a navigation based on an additional filter that includes viewport configuration as well. Accordingly, when at least one focusable and criteria meeting node has been found in the current viewport 1, a subsequent navigation command from the user will cause a jump from viewport 1 to a first criteria meeting focusable node in viewport 2, thereby even bypassing remaining criteria meeting focusable nodes in the viewport 1. Such direct jump from viewport 1 to 2 is performed because it is assumed that user is expected to be aware of all criteria meeting focusable nodes in viewport 1, even if only a single criteria meeting node has been highlighted therein. Likewise, further navigation commands from the user may lead to a direct jump from viewport 2 to viewport 3 or back to viewport 1, depending upon whether at least one criteria meeting node is available at the viewport 3 or subsequent viewports.

Now considering the exemplary scenario depicted in present figure, the navigation module 204 has selected node 1 as it is first relevant focusable node because it is first relevant node in viewport 1. Now, as the user gives a signal to navigate further, the navigation module 204 searches next relevant focusable node meeting the criteria of having "Company A" as its name. Although there is another node 2 in viewport 1 that also fulfils the criteria, yet the present navigation method instead prefers to highlight a criteria meeting node 3 that is located in viewport 2. Accordingly, "Company A" product (i.e. node 3) in viewport 2 gets highlighted subsequent to node 1.

Without limiting the scope of the present subject matter, the present Viewport based navigation may also be applicable when plain text is searched across the web-page using "find text" i.e. Cntrl+f based functionality. In such a scenario, a next viewport will be switched once at least one "relevant text" has been located and highlighted in the first viewport.

Figure 19:
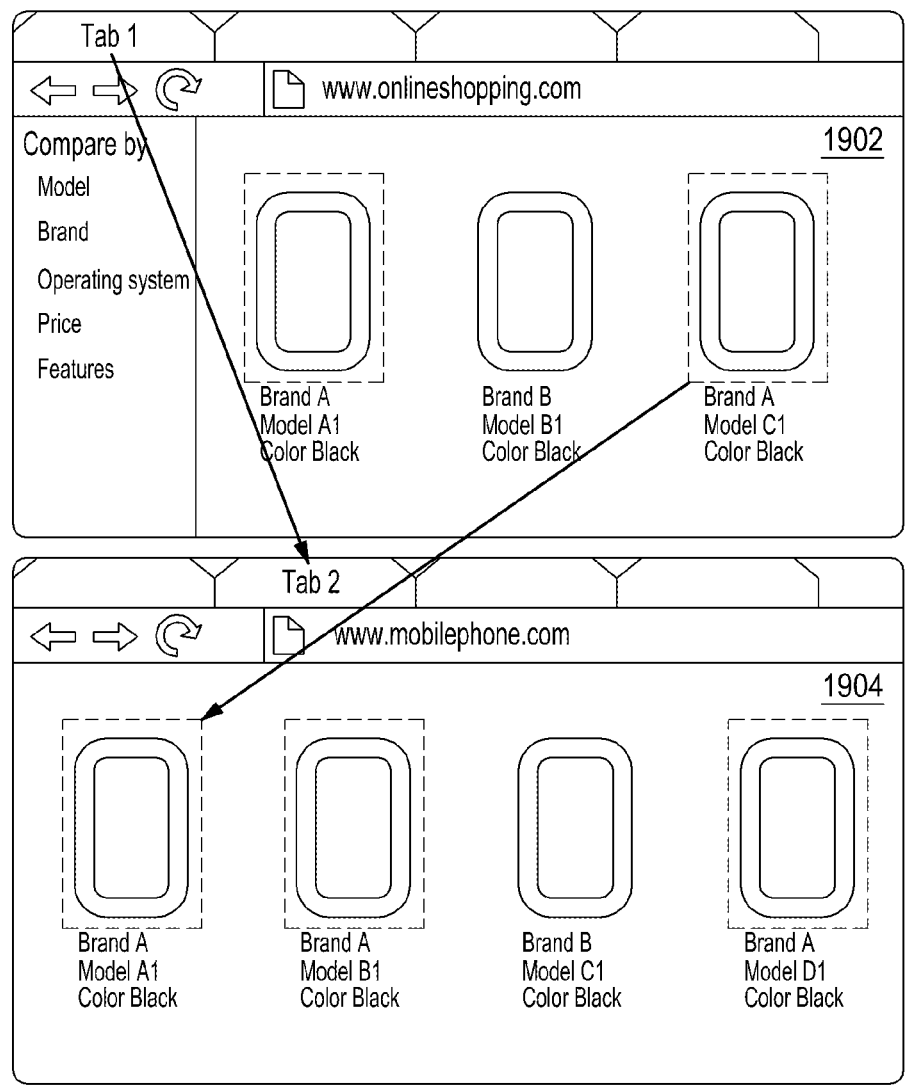
FIG. 19 illustrates a tab based navigation of the web-pages based on receipt of a user input, in accordance with the present disclosure.

FIG. 19 illustrates an exemplary tab-based navigation of the web-pages 1902 and 1904 based on receipt of a user input, in accordance with the present disclosure. The navigation mode is activated based upon the user choosing the tab based navigation as an auxiliary setting alongside selecting the usual content setting for navigation purposes. Further, the present tab based navigation mode also finds mention as a part of steps 410 and 510 in flowcharts provided at FIG. 4 and FIG. 5B.

Under the present mode of navigation, the user selected criteria filter for searching focusable nodes associated with "a selected text" throughout the tabs is aimed to expand the scope of navigation as proposed in the subject matter towards all tabs existing in the tab window. In operation, user can select the filter as being a combination of content setting and the "tab based navigation" chosen as the auxiliary setting. Accordingly, the navigation module 204 checks cached nodes information, in terms of the content setting based criteria, in respect of the web-page in the current tab. Accordingly, till the time the current tab has criteria meeting focusable nodes that have not been traversed yet, the navigation proceeds within the present tab.

Gradually, as the last relevant node in current tab gets highlighted, the user may be still keen on navigating beyond the current tab and provides a further command. Accordingly, the navigation module 204 now checks the cached information of the next tab in terms of the content setting based criteria. If a match is found, then the next tab is switched and a relevant focusable node gets selected select. Else, further opened tabs are examined to find a match.

As shown in the present figure, all "Brand A" based mobile phone get highlighted in first tab (i.e. Tab 1) in a sequential manner based upon the navigation commands. Accordingly, when the last Brand A mobile phone in Tab 1 gets highlighted and the user still provides a navigation command, a next tab is switched and the first Brand A mobile phone in Tab 2 gets highlighted automatically.

Further, the present use in FIG. 19 may be also expanded to cover a scenario, wherein the navigation based on content setting and auxiliary setting also leads to highlighting of the relevant focusable nodes in web-page that are associated with user browsing history, Bookmarks or "Favorites" category of a user's personal computing system. Accordingly, such a scenario will leads to an automatic activation of such type of web-pages in the browser window and relevant nodes may be highlighted therein.

The navigation commands as discussed in the described subject-matter so far may be received from at least one of pointer, mouse, keyboard, gesture, voice, touch, stylus. As far as the keyboard is concerned, the control buttons known in context of navigation (Tab, Shift, Control, arrow keys, back button, Page up. Page down, etc) may be contemplated as providing navigation command is in term of the present subject matter.

The present subject matter as described above facilitates a provision of a faster and customized navigation in a webpage based on types and nature of focusable nodes or web elements. The time efficiency is achieved at least through bypassing non-desired focusable elements during the navigation. Moreover, the user is enabled to plan the course of navigation over the web-page as per his/her needs to navigate only across desired focusable elements.

Further, the present subject matter facilitates a faster navigation on tab/link mode on Web-Pages displayed in any Browser. As there are number of devices where there is no touch-gesture based input receiving units, the present disclosure is configured to assist even such devices by enabling a rich user interaction with web-pages that are opened on non-touch gesture based device like television.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method for navigation in a webpage or between webpages, the method comprising:
   receiving a command to navigate from a first element to a second element in the webpage or between the webpages;
   providing a first user interface to generate a plurality of second filters;
   providing a second user interface to display the plurality of second filters;
   selecting a first filter from the plurality of second filters through the second user interface, wherein the plurality of second filters comprises respectively corresponding sets of content-based settings related to navigation options;
   identifying at least one content-based setting based on the first filter;
   obtaining focusable nodes from a document object model (DOM) tree based on the at least one content-based setting, wherein the focusable nodes match the at least one content-based setting; and
   navigating through the webpage or between the webpages from the first element to the second element based on the focusable nodes, wherein the first element is a focused element and the second element corresponds to one of the focusable nodes.

2. The method of claim 1, wherein the at least one content-based setting comprises at least one of an element setting or an element attribute setting.

3. The method of claim 2, wherein the element setting comprises a setting based on at least one of image, audio, video, multimedia, text or hyperlink.

4. The method of claim 3, wherein the navigating through the webpage or between webpages from the first element to the second element based on the focusable nodes comprises:
   a. navigating through the webpage or between the webpages is from an image element to another image element when the element setting is set to an image;
   b. navigating through the webpage or between the webpages is from an audio element to another audio element when the element setting is set to an audio;
   c. navigating through the webpage or between the webpages is from a video element to another video element when the element setting is set to a video;
   d. navigating through the webpage or between the webpages is from a multimedia element to another multimedia element when the element setting is set to a multimedia;
   e. navigating through the webpage or between the webpages is from a webpage element comprising text to another webpage element comprising text when the element setting is set to a text; or
   f. navigating through the webpage or between the webpages is from a hyperlink to another hyperlink when the element setting is set to a hyperlink.

5. The method of claim 2, wherein the element attribute setting comprises setting based on at least one of an image size, an image resolution, an image name, an image type, an audio size, an audio resolution, an audio name, an audio type, a video size, a video resolution, a video name, a video type, a text content, a text font, a text size, a text property, a multimedia size, a multimedia name, a multimedia type, a hyperlink type, or a hyperlink content.

6. The method of claim 5, wherein the navigating through the webpage or between the webpages from the first element to the second element based on the focusable nodes comprises:
   a. navigating through the webpage or between the webpages is from an image element meeting the image size to another image element meeting the image size when the element setting is based on image and the element attribute setting is based on the image size;
   b. navigating through the webpage or between the webpages is from an image element meeting the image resolution to another image element meeting the image resolution when the element setting is based on image and the element attribute setting is based on the image resolution;
   c. navigating through the webpage or between the webpages is from an image element meeting the image name to another image element meeting the image name when the element setting is based on image and the element attribute setting is based on the image name;
   d. navigating through the webpage or between the webpages is from an image element meeting the image type to another image element meeting the image type when the element setting is based on image and the element attribute setting is based on the image type;
   e. navigating through the webpage or between the webpages is from an audio element meeting the audio size to another audio element meeting the audio size when the element setting is based on audio and the element attribute setting is based on the audio size;
   f. navigating through the webpage or between the webpages is from an audio element meeting the audio resolution to another audio element meeting the audio resolution when the element setting is based on audio and the element attribute setting is based on the audio resolution;
   g. navigating through the webpage or between the webpages is from an audio element meeting the audio name to another audio element meeting the audio name when the element setting is based on audio and the element attribute setting is based on the audio name;
   h. navigating through the webpage is from an audio element meeting the audio type to another audio element meeting the audio type when the element setting is based on audio and the element attribute setting is based on the audio type;
   i. navigating through the webpage or between the webpages is from a video element meeting the video size to another video element meeting the video size when the element setting is based on video and the element attribute setting is based on the video size;

j. navigating through the webpage or between the webpages is from a video element meeting the video resolution to another video element meeting the video resolution when the element setting is based on video and the element attribute setting is based on the video resolution;

k. navigating through the webpage or between the webpages is from a video element meeting the video name to another video element meeting the video name when the element setting is based on video and the element attribute setting is based on the video name;

l. navigating through the webpage or between the webpages is from a video element meeting the video type to another audio element meeting the video type when the element setting is based on video and the element attribute setting is based on the video type;

m. navigating through the webpage or between the webpages is from a text element meeting the text content to another text element meeting the text content when the element setting is based on text and the element attribute setting is based on the text content;

n. navigating through the webpage or between the webpages is from a text element meeting the text font to another text element meeting the text font when the element setting is based on text and the element attribute setting is based on the text font;

o. navigating through the webpage or between the webpages is from a text element meeting the text size to another text element meeting the text size when the element setting is based on text and the element attribute setting is based on the text size;

p. navigating through the webpage or between the webpages is from a text element meeting the text property to another text element meeting the text property when the element setting is based on text and the element attribute setting is based on the text property;

q. navigating through the webpage or between the webpages is from a multimedia element meeting the multimedia size to another multimedia element meeting the multimedia size when the element setting is based on multimedia and the element attribute setting is based on the multimedia size;

r. navigating through the webpage or between the webpages is from a multimedia element meeting the multimedia name to another multimedia element meeting the multimedia name when element setting is based on multimedia and the element attribute setting is based on the multimedia name;

s. navigating through the webpage or between the webpages is from a multimedia element meeting the multimedia type to another multimedia element meeting the multimedia type when the element setting is based on multimedia and the element attribute setting is based on the multimedia type;

t. navigating through the webpage or between the webpages is from a hyperlink element meeting the hyperlink type to another hyperlink element meeting the hyperlink type when the element setting is based on hyperlink and the element attribute setting is based on the hyperlink type; or u. navigating through the webpage or between the webpages is from a hyperlink element meeting the hyperlink content to another hyperlink element meeting the hyperlink content when the element setting is based on hyperlink and the element attribute setting is based on the hyperlink content.

7. The method of claim 2, wherein if the at least one content-based setting includes the element setting and the element attribute setting, navigating through the webpage or between the webpages is from the first element meeting the element setting and the element attribute setting to the second element meeting the element setting and the element attribute setting.

8. The method of claim 1, wherein the command is received from at least one of a pointer, a mouse, a keyboard, a gesture, a voice, a touch, or a stylus.

9. The method of claim 1, further comprising:
identifying at least one auxiliary setting based on the first filter, wherein the at least one auxiliary setting is a non-content based setting that relates to characteristics of a web browser displaying the webpage.

10. The method of claim 9, wherein the at least one auxiliary setting includes at least one of a window setting, a tab or a viewport setting.

11. The method of claim 10, further comprising:
navigating from the first element contained in a first viewport of the webpage to the second element contained in a second viewport of the webpage based on the viewport setting.

12. The method of claim 10, further comprising:
navigating from the first element contained in a first webpage to the second element contained in a second webpage based on the window setting or the tab setting.

13. The method of claim 9, wherein the content-based setting and the at least one auxiliary setting are received from a user interface.

14. An apparatus for navigation in a webpage or between webpages, the apparatus comprising:
a processor programmed to control to:
receive a command to navigate from a first element to a second element in the webpage or between the webpages;
provide a first user interface to generate a plurality of second filters;
provide a second user interface to display the plurality of second filters;
select a first filter from the plurality of second filters through the second user interface, wherein the plurality of second filters comprises respectively corresponding sets of content-based settings related to navigation options;
identify at least one content-based setting based on the first filter;
obtain focusable nodes from a document object model (DOM) tree based on the at least one content-based setting, wherein the focusable nodes match the at least one content-based setting; and
navigate through the webpage or between the webpages from the first element to the second element based on the focusable nodes, wherein the first element is a focused element and the second element corresponds to one of the focusable nodes.

15. The apparatus of claim 14, wherein at least one content-based setting comprises at least one of an element setting or an element attribute setting.

16. The apparatus of claim 15, wherein the element setting comprises a setting based on image, audio, video, multimedia, text or hyperlink.

17. The apparatus as claimed in claim 15, wherein the element attribute setting comprises setting based on at least one of an image size, an image resolution, an image name, an image type, an audio size, an audio resolution, an audio name, an audio type, a video size, a video resolution, a video name, a video type, a text content, a text font, a text size, a text property, a multimedia size, a multimedia name, a multimedia type, a hyperlink type, or a hyperlink content.

18. The apparatus as claimed in claim 15, wherein if the at least one content-based setting includes the element setting and the element attribute setting, navigating through the webpage or between the webpages is from the first element meeting the element setting and the element attribute setting to the second element meeting the element setting and the element attribute setting.

19. The apparatus of claim 15, wherein the processor is further programmed to control to navigate through at least one of:
   a. from the first element contained in a first viewport of the webpage to the second element contained in a second viewport of the webpage based on a viewport setting included in an auxiliary setting from a user; or
   b. from the first element contained in a first webpage to the second element contained in a second webpage, based on a window setting or a tab setting included in the auxiliary setting.

\* \* \* \* \*